(12) United States Patent
Gross et al.

(10) Patent No.: US 11,643,356 B2
(45) Date of Patent: May 9, 2023

(54) WATER-CONTAINING GLASS-BASED ARTICLES WITH HIGH INDENTATION CRACKING THRESHOLD

(71) Applicant: CORNING INCORPORATED, Corning, NY (US)

(72) Inventors: Timothy Michael Gross, Painted Post, NY (US); Georgiy M Guryanov, Boca Raton, FL (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/838,404

(22) Filed: Jun. 13, 2022

(65) Prior Publication Data

US 2022/0324747 A1   Oct. 13, 2022

Related U.S. Application Data

(63) Continuation of application No. 17/533,506, filed on Nov. 23, 2021, now Pat. No. 11,377,386, which is a
(Continued)

(51) Int. Cl.
| | |
|---|---|
| *B32B 15/04* | (2006.01) |
| *B32B 17/06* | (2006.01) |
| *C03C 3/097* | (2006.01) |
| *C03C 3/083* | (2006.01) |
| *C03C 21/00* | (2006.01) |
| *C03C 3/105* | (2006.01) |

(52) U.S. Cl.
CPC .............. *C03C 3/097* (2013.01); *C03C 3/083* (2013.01); *C03C 3/105* (2013.01); *C03C 21/007* (2013.01); *C03B 2201/21* (2013.01)

(58) Field of Classification Search
CPC ....... C03C 3/097; C03C 3/083; C03C 21/007; C03C 2201/21
USPC ................. 428/426, 432, 409, 410
See application file for complete search history.

(56) References Cited

U.S. PATENT DOCUMENTS

| | | |
|---|---|---|
| 2,273,778 A | 2/1942 | Berthold |
| 2,377,062 A | 5/1945 | Frederick et al. |
| (Continued) | | |

FOREIGN PATENT DOCUMENTS

| | | |
|---|---|---|
| BE | 382736 A | 9/1931 |
| CN | 101801869 A | 8/2010 |
| (Continued) | | |

OTHER PUBLICATIONS

Bartholomew; "Water in Glass"; Treatise on Materials Science and Technology; vol. 22, Glass III Eda. M. Tomozawa and RH Doremus. (Academic Press 1982) 75-127.
(Continued)

*Primary Examiner* — Lauren R Colgan
(74) *Attorney, Agent, or Firm* — Russell Magaziner

(57) ABSTRACT

Glass-based articles that include a hydrogen-containing layer extending from the surface of the article to a depth of layer. The hydrogen-containing layer includes a hydrogen concentration that decreases from a maximum hydrogen concentration to the depth of layer. The glass-based articles exhibit a high Vickers indentation cracking threshold. Glass compositions that are selected to promote the formation of the hydrogen-containing layer and methods of forming the glass-based article are also provided.

16 Claims, 8 Drawing Sheets

Related U.S. Application Data continuation of application No. 16/193,210, filed on Nov. 16, 2018, now Pat. No. 11,214,510.

(60) Provisional application No. 62/587,872, filed on Nov. 17, 2017.

(56) References Cited

U.S. PATENT DOCUMENTS

| | | |
|---|---|---|
| 3,275,470 A | 9/1966 | Charles |
| 3,395,998 A | 8/1968 | Olcott |
| 3,485,647 A | 12/1969 | Harrington |
| 3,498,802 A | 3/1970 | Bickford et al. |
| 3,498,803 A | 3/1970 | Stookey |
| 3,653,864 A | 4/1972 | Rothermel et al. |
| 3,756,798 A | 9/1973 | Ernsberger |
| 3,811,853 A | 5/1974 | Bartholomew et al. |
| 3,843,344 A | 10/1974 | Galey |
| 3,912,481 A | 10/1975 | Bartholomew et al. |
| 3,915,720 A | 10/1975 | Tarcza |
| 3,948,629 A | 4/1976 | Bartholomew et al. |
| 4,042,405 A | 8/1977 | Krohn et al. |
| 4,053,679 A | 10/1977 | Rinehart |
| 4,098,596 A | 7/1978 | Wu |
| 4,099,978 A | 7/1978 | Bartholomew et al. |
| 4,102,693 A | 7/1978 | Owen et al. |
| 4,133,665 A | 1/1979 | Bartholomew et al. |
| 4,175,942 A | 11/1979 | Lipp |
| 4,201,561 A | 5/1980 | Pierson et al. |
| 4,214,886 A | 7/1980 | Shay et al. |
| 5,475,528 A | 12/1995 | LaBorde |
| 5,698,019 A | 12/1997 | Frank et al. |
| 6,200,137 B1 | 3/2001 | Hoeland et al. |
| 6,376,402 B1 | 4/2002 | Pannhorst et al. |
| 7,534,734 B2 | 5/2009 | Ellison |
| 7,666,511 B2 | 2/2010 | Ellison et al. |
| 7,833,919 B2 | 11/2010 | Danielson et al. |
| 7,846,857 B2 | 12/2010 | Hoeland et al. |
| 7,851,394 B2 | 12/2010 | Ellison |
| 7,891,212 B2 | 2/2011 | Isono |
| 7,937,967 B2 | 5/2011 | Minazawa |
| 8,075,999 B2 | 12/2011 | Barefoot et al. |
| 8,158,543 B2 | 4/2012 | Dejneka et al. |
| 8,187,987 B2 | 5/2012 | Amin et al. |
| 8,232,218 B2 | 7/2012 | Dejneka et al. |
| 8,586,492 B2 | 11/2013 | Barefoot et al. |
| 8,598,056 B2 | 12/2013 | Ellison et al. |
| 8,759,238 B2 | 6/2014 | Chapman et al. |
| 8,802,581 B2 | 8/2014 | Dejneka et al. |
| 8,854,623 B2 | 10/2014 | Fontaine et al. |
| 8,969,226 B2 | 3/2015 | Dejneka et al. |
| 9,156,724 B2 | 10/2015 | Gross |
| 9,162,919 B2 | 10/2015 | Ellison et al. |
| 9,321,677 B2 | 4/2016 | Chang et al. |
| 9,346,703 B2 | 5/2016 | Bookbinder et al. |
| 9,527,767 B2 | 12/2016 | Ellison et al. |
| 9,622,483 B2 | 4/2017 | Bookbinder et al. |
| 9,682,885 B2 | 6/2017 | Gross |
| 9,783,453 B2 | 10/2017 | Gross |
| 9,802,857 B2 | 10/2017 | Bowden et al. |
| 9,815,733 B2 | 11/2017 | Dejneka et al. |
| 9,890,073 B2 | 2/2018 | Kase |
| 9,969,644 B2 | 5/2018 | Gross et al. |
| 9,975,803 B2 | 5/2018 | Gross |
| 10,017,412 B2 | 7/2018 | Bookbinder et al. |
| 2004/0107733 A1 | 6/2004 | Yashizawa |
| 2005/0223746 A1 | 10/2005 | Yoshizawa et al. |
| 2009/0098998 A1 | 4/2009 | Minazawa |
| 2009/0129061 A1 | 5/2009 | Fechner et al. |
| 2009/0325776 A1 | 12/2009 | Murata |
| 2010/0035745 A1 | 2/2010 | Murata |
| 2010/0215993 A1 | 8/2010 | Yagi et al. |
| 2011/0014475 A1 | 1/2011 | Murata |
| 2011/0092353 A1 | 4/2011 | Amin et al. |
| 2012/0108414 A1 | 5/2012 | Ruedinger et al. |
| 2012/0135226 A1 | 5/2012 | Bookbinder et al. |
| 2012/0277085 A1 | 11/2012 | Bookbinder et al. |
| 2013/0122284 A1 | 5/2013 | Gross |
| 2013/0186139 A1 | 7/2013 | Tanii |
| 2013/0224492 A1 | 8/2013 | Bookbinder et al. |
| 2013/0295353 A1 | 11/2013 | Drake et al. |
| 2013/0316162 A1 | 11/2013 | Murata et al. |
| 2013/0330599 A1 | 12/2013 | Kroll et al. |
| 2013/0343166 A1 | 12/2013 | Matsumoto et al. |
| 2014/0335331 A1 | 11/2014 | Ellison et al. |
| 2015/0064474 A1 | 3/2015 | Dejneka et al. |
| 2015/0079398 A1 | 3/2015 | Amin et al. |
| 2015/0140336 A1 | 5/2015 | Sakagami et al. |
| 2015/0147576 A1 | 5/2015 | Bookbinder et al. |
| 2015/0230476 A1 | 8/2015 | Bookbinder et al. |
| 2015/0259244 A1 | 9/2015 | Amin et al. |
| 2016/0122239 A1 | 5/2016 | Amin et al. |
| 2016/0137549 A1 | 5/2016 | Meiss et al. |
| 2016/0145152 A1 | 5/2016 | Martin et al. |
| 2016/0225396 A1 | 8/2016 | Shimojima |
| 2017/0008797 A1 | 1/2017 | Wagner |
| 2017/0217827 A1 | 8/2017 | Aitken et al. |
| 2017/0283304 A1 | 10/2017 | Yamazaki et al. |
| 2017/0361574 A1 | 12/2017 | Kiczenski et al. |
| 2018/0265398 A1 | 9/2018 | Yamazaki et al. |
| 2018/0282201 A1 | 10/2018 | Hancock et al. |
| 2018/0317496 A1 | 11/2018 | Bookbinder et al. |
| 2019/0152838 A1 | 5/2019 | Gross et al. |
| 2019/0195510 A1 | 6/2019 | Weiss et al. |
| 2019/0367408 A1 | 12/2019 | Harris et al. |
| 2020/0156996 A1 | 5/2020 | Gross et al. |
| 2020/0156997 A1 | 5/2020 | Gross et al. |
| 2020/0308047 A1 | 10/2020 | Glacki et al. |
| 2021/0214269 A1 | 7/2021 | Yuki |

FOREIGN PATENT DOCUMENTS

| | | |
|---|---|---|
| CN | 104411648 A | 3/2015 |
| CN | 105765499 A | 7/2016 |
| CN | 108341595 A | 7/2018 |
| DE | 4026814 A1 | 2/1992 |
| DE | 102016109085 A1 | 11/2017 |
| DE | 202018102537 U1 | 5/2018 |
| EP | 0690030 A1 | 1/1996 |
| EP | 0885856 A2 | 12/1998 |
| EP | 1888474 A1 | 2/2008 |
| GB | 1454335 A | 11/1976 |
| JP | 06-092674 B2 | 11/1994 |
| JP | 08-290936 A | 11/1996 |
| JP | 2001-226138 A | 8/2001 |
| JP | 2016-183091 A | 10/2016 |
| JP | 6474041 B2 | 2/2019 |
| SU | 1100252 A1 | 6/1984 |
| WO | 2006/131473 A1 | 12/2006 |
| WO | 2007/013538 A1 | 2/2007 |
| WO | 2009/055745 A1 | 4/2009 |
| WO | 2014/201318 A1 | 12/2014 |
| WO | 2016/094282 A1 | 6/2016 |
| WO | 2016/104454 A1 | 6/2016 |
| WO | 2018/136388 A1 | 7/2018 |
| WO | 2019/055745 A1 | 3/2019 |
| WO | 2019/099814 A1 | 5/2019 |
| WO | 2020/102127 A2 | 5/2020 |
| WO | 2020/102147 A2 | 5/2020 |

OTHER PUBLICATIONS

Chinese Patent Application No. 201880074555.7, Office Action, dated Mar. 8, 2022, 23 pages (12 pages of English Translation and 11 pages of Original Document), Chinese Patent Office.

Enss, "Investigations on the Dependency of the Relative Susceptibility of Glass to Attack by Water on its Chemical Composition", Glastech Ber. vol. 5, No. 11, p. 509, 1927.

Fett et al. "Effect of water on the inert strength of silica glass: role of water penetration", J Am Ceram Soc 95(12) 2012. pp 3847-3853.

Fett et al. "Estimation of ion exchange layers for soda-lime-silicate glass from curvature measurements", J Mater Sci 41, 2006. pp 5006-5010.

(56) References Cited

OTHER PUBLICATIONS

Fett et al. "Stresses in ion-exchange layers of soda-soda-lime-silicate glass", Fatigue Fract Engng Mater Struct 28, 2005. pp 507-514.

Fett et al., "Interpretation of effects at the static fatigue limit of soda-lime-silicate glass" Engineering Fracture Mechanics, vol. 72, 2774-2791 (2005).

Gehrke et al; "Fatigue Limit and Crack Arrest in Alkali-Containing Silicate Glasses" Journal of Materials Science; 26 (1991) pp. 5445-5455.

Haider et al., "The Diffusion of 'Water' Into Some Simple Silicate and Aluminosilicate Glasses At Temperatures Near the Transformation Range", Glass Technology vol. 11 No. 6, Dec. 1970, 6 pages.

International Search Report and Writien Opinion of the European International Searching Authority; PCT/US2019/060817; dated Apr. 8, 2020; 12 Pgs.

International Search Report and Written Opinion of the International Searching Authority; PCT/US20/032422; dated Jul. 27, 2020; 13 pages; European Patent Office.

International Search Report and Written Opinion of the International Searching Authority; PCT/US2018/061500; dated Apr. 8, 2019, 9 pages; European Patent Office.

Invitation to Pay Additional Fees; PCT/US2019/060819; dated Apr. 8, 2020; 12 Pages; European International Searching Authority.

Invitation to Pay Additional Fees; PCT/US2019/060847; dated May 6, 2020; 13 Pages; European International Searching Authority.

Kuznetsova et al., "Effect of the Composition of Complex Silicate Glasses on Water and Gas Leaching", Fizika i khimiya Stekla, vol. 15, No. 2, pp. 245-251, 1989.

Lanford et al. "Hydration of soda-lime glass", Journal of Non-Crystalline Solids 33, 1979. pp 249-266.

Leko, "Influence of Composition and Temperature on the Absorption Band Intensity for Water in Alkali Silicate Glasses", Glass Physics and Chemistry, vol. 23, No. 3, pp. 214-224, 1997.

Li and Tomozawa, "Mechanical strength increase of abraded silica glass by high pressure water vapor treatment", Journal of Non-Crystalline Solids 168 (1994) 287-292.

Liu et al. "Nanocrystal formation and photoluminescence in the Yb3 +/Er3 + codoped phosphosilicate glasses", Journal of Non-Crystalline Solids, 2014, vol. 383, p. 141-145.

Patent Cooperation Treaty, International Search Report and Written Opinion, for International Application US/2020/032422 (filed May 12, 2020), performed by European Patent Office, dated Jul. 27, 2020 (14 pgs).

Sarkisov et al, "Effect of the liquation structure on the chemical stability of glasses of the Si02—Ca0—Al203—K20—P2O5 System", Phsyics and Chemistry of Glass 14(3) 1988, pp. 445-451.

Scholze, "Gases and Water in Glass",—Part Two; Institute for Glass and Ceramics, University of Berlin, Lectures on Glass and Technology Rensselaer Polytechnic Institute, Troy, N.Y, Mar. 30-Apr. 1, 1966, pp. 622-628.

Spierings, "The near Infared Absorption of Water in Glasses", Physics and Chemistry of Glasses, vol. 23, No. 4, pp. 129-134, Aug. 1982.

Steklo et al., "Molar Volumes and Refractive Indices of Water-Containing Aluminosilicate Glasses", Steklo, No. 2, pp. 65, 1978.

Takata et al., "Effect of Water Content on Mechanical Properties of Na20—Si02 Glasses," Communications of the American Ceramic Society, 1982, C-156-C157.

Tsong, et al., "Evidence for Interdiffusion of Hydronium and Alkali Ions in Leached Glasses", Applied Physics Letters, vol. 39, (1981), pp. 669-670.

Wiederhorn et al. "Effect of water penetration on the strength and toughness of silica glass", J Am Ceram Soc 94(S1) 2011, pp. S196-S203.

Wiederhorn et al. "Volume expansion caused by water penetration into silica glass", J Am Ceram Soc 98(1) 2015, pp. 78-87.

Wiederhorn et al. "Water penetration—its effect on the strength and toughness of silica glass", Metallurgical and Materials Transactions A, 44A, Mar. 2013. pp. 1165-1174.

Yoko et al, "Hydration of silicate, phosphate and borate glasses in an autoclave", Riv. Staz. Sper. Vetro, vol. 14, No. 5, pp. 99-194, 1984.

Yoko et al., "Hydration of Silicate Glasses by Water Vapor at High Temperature", Glastech. Ber. vol. 56K, pt 1, pp. 650-655, 1983.

10 kgf 5 kgf

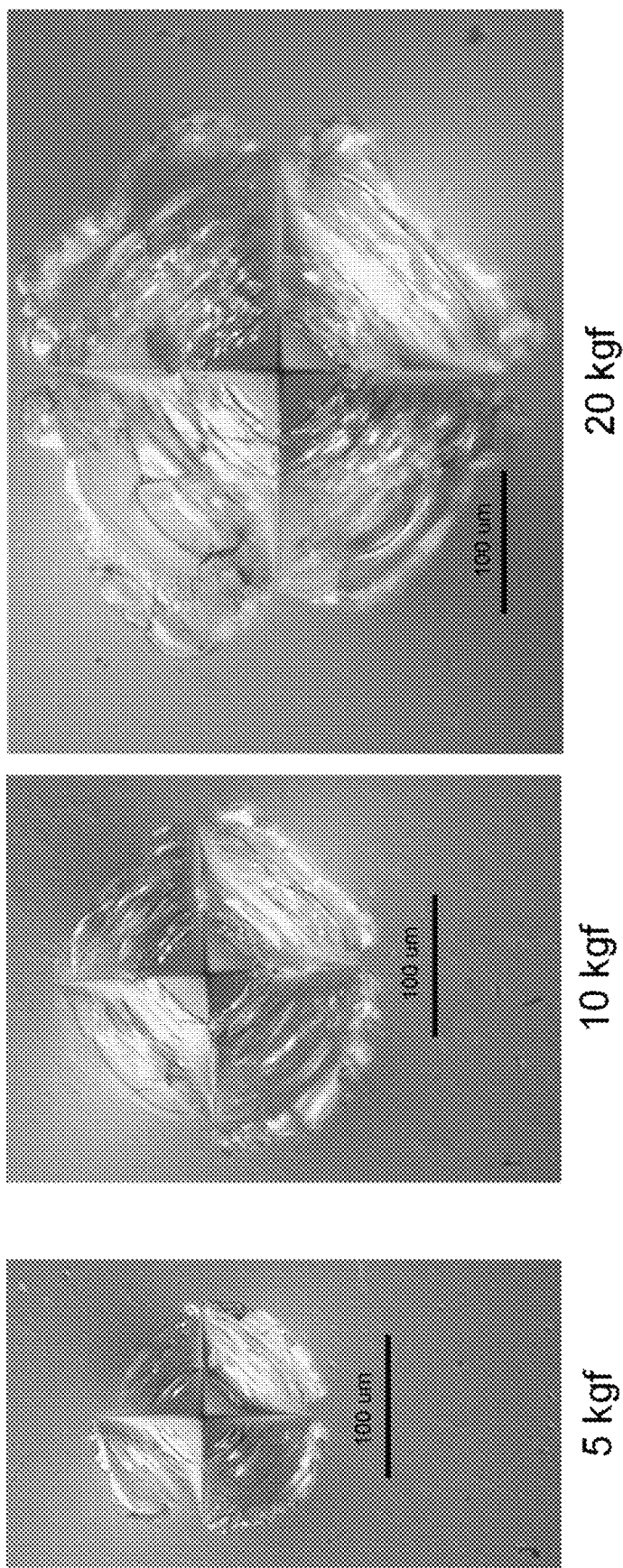

WATER-CONTAINING GLASS-BASED ARTICLES WITH HIGH INDENTATION CRACKING THRESHOLD

RELATED APPLICATIONS

This Application is a continuation of U.S. application Ser. No. 17/533,506 filed Nov. 23, 2021, which is a continuation of U.S. application Ser. No. 16/193,210 filed Nov. 16, 2018, which issued on Jan. 4, 2022 as U.S. Pat. No. 11,214,510 and which claims the priority benefit of U.S. Application No. 62/587,872 filed Nov. 17, 2017, each of which is incorporated by reference herein in its entirety

BACKGROUND

Field

This disclosure relates to glass-based articles that contain hydrogen, glass compositions utilized to form the glass-based articles, and methods of forming the glass-based articles.

Technical Background

Portable electronic devices, such as, smartphones, tablets, and wearable devices (such as, for example, watches and fitness trackers) continue to get smaller and more complex. As such, materials that are conventionally used on at least one external surface of such portable electronic devices also continue to get more complex. For instance, as portable electronic devices get smaller and thinner to meet consumer demand, the display covers and housings used in these portable electronic devices also get smaller and thinner, resulting in higher performance requirements for the materials used to form these components.

Accordingly, a need exists for materials that exhibit higher performance, such as resistance to damage, for use in portable electronic devices.

SUMMARY

In aspect (1), a glass-based article is provided. The glass-based article comprises: $SiO_2$, $Al_2O_3$, and $P_2O_5$; and a hydrogen-containing layer extending from a surface of the glass-based article to a depth of layer. A hydrogen concentration of the hydrogen-containing layer decreases from a maximum hydrogen concentration to the depth of layer, and the depth of layer is greater than 5 μm.

In aspect (2), the glass-based article of aspect (1) is provided, wherein the glass-based article has a Vicker's crack initiation threshold of greater than or equal to 1 kgf.

In aspect (3), the glass-based article of aspect (1) or (2) is provided, wherein the depth of layer is greater than or equal to 10 μm.

In aspect (4), the glass-based article of any of aspects (1) to (3) is provided, wherein the maximum hydrogen concentration is located at the surface of the glass-based article.

In aspect (5), the glass-based article of any of aspects (1) to (4) is provided, further comprising at least one of $Li_2O$, $Na_2O$, $K_2O$, $Cs_2O$, and $Rb_2O$.

In aspect (6), the glass-based article of any of aspects (1) to (5) is provided, further comprising $K_2O$.

In aspect (7), the glass-based article of any of aspects (1) to (6) is provided, wherein the center of the glass-based article comprises: greater than or equal to 45 mol % to less than or equal to 75 mol % $SiO_2$; greater than or equal to 3 mol % to less than or equal to 20 mol % $Al_2O_3$; greater than or equal to 6 mol % to less than or equal to 15 mol % $P_2O_5$; and greater than or equal to 6 mol % to less than or equal to 25 mol % $K_2O$.

In aspect (8), the glass-based article of any of aspects (1) to (6) is provided, wherein the center of the glass-based article comprises: greater than or equal to 45 mol % to less than or equal to 75 mol % $SiO_2$; greater than or equal to 3 mol % to less than or equal to 20 mol % $Al_2O_3$; greater than or equal to 4 mol % to less than or equal to 15 mol % $P_2O_5$; and greater than or equal to 11 mol % to less than or equal to 25 mol % $K_2O$.

In aspect (9), the glass-based article of any of aspects (1) to (6) is provided, wherein the center of the glass-based article comprises: greater than or equal to 55 mol % to less than or equal to 69 mol % $SiO_2$; greater than or equal to 5 mol % to less than or equal to 15 mol % $Al_2O_3$; greater than or equal to 6 mol % to less than or equal to 10 mol % $P_2O_5$; and greater than or equal to 10 mol % to less than or equal to 20 mol % $K_2O$.

In aspect (10), the glass-based article of any of aspects (7) to (9) is provided, wherein the center of the glass-based article comprises: greater than or equal to 0 mol % to less than or equal to 10 mol % $Cs_2O$; and greater than or equal to 0 mol % to less than or equal to 10 mol % $Rb_2O$.

In aspect (11), the glass-based article of any of aspects (1) to (10) is provided, wherein the glass-based article is substantially free of at least one of lithium and sodium.

In aspect (12), the glass-based article of any of aspects (1) to (11) is provided, further comprising a compressive stress layer extending from a surface of the glass-based article into the glass-based article to a depth of compression.

In aspect (13), the glass-based article of aspect (12) is provided, wherein the compressive stress layer comprises a compressive stress of at least about 100 MPa and the depth of compression is at least about 75 μm.

In aspect (14), a consumer electronic product is provided. The consumer electronic product comprises: a housing comprising a front surface, a back surface and side surfaces; electrical components at least partially within the housing, the electrical components comprising at least a controller, a memory, and a display, the display at or adjacent the front surface of the housing; and a cover substrate disposed over the display. At least a portion of at least one of the housing or the cover substrate comprises the glass-based article of any of aspects (1) to (13).

In aspect (15), a glass is provided. The glass comprises: greater than or equal to 45 mol % to less than or equal to 75 mol % $SiO_2$; greater than or equal to 3 mol % to less than or equal to 20 mol % $Al_2O_3$; greater than or equal to 6 mol % to less than or equal to 15 mol % $P_2O_5$; and greater than or equal to 6 mol % to less than or equal to 25 mol % $K_2O$.

In aspect (16), the glass of aspect (15) is provided, comprising: greater than or equal to 55 mol % to less than or equal to 69 mol % $SiO_2$; greater than or equal to 5 mol % to less than or equal to 15 mol % $Al_2O_3$; greater than or equal to 6 mol % to less than or equal to 10 mol % $P_2O_5$; and greater than or equal to 10 mol % to less than or equal to 20 mol % $K_2O$.

In aspect (17), the glass of aspect (15) or (16) is provided, further comprising: greater than or equal to 0 mol % to less than or equal to 10 mol % $Cs_2O$; and greater than or equal to 0 mol % to less than or equal to 10 mol % $Rb_2O$.

In aspect (18), the glass of any of aspects (15) to (17) is provided, wherein the glass is substantially free of lithium.

In aspect (19), the glass of any of aspects (15) to (18) is provided, wherein the glass is substantially free of sodium.

In aspect (20), the glass of any of aspects (15) to (19) is provided, comprising: greater than or equal to 58 mol % to less than or equal to 63 mol % $SiO_2$; greater than or equal to 7 mol % to less than or equal to 14 mol % $Al_2O_3$; greater than or equal to 7 mol % to less than or equal to 10 mol % $P_2O_5$; and greater than or equal to 15 mol % to less than or equal to 20 mol % $K_2O$.

In aspect (21), the glass of any of aspects (15) to (20) is provided, wherein the glass has a Vicker's crack initiation threshold of greater than or equal to 5 kgf.

In aspect (22), the glass of any of aspects (15) to (21) is provided, further comprising at least one of $Li_2O$, $Na_2O$, $Cs_2O$, and $Rb_2O$.

In aspect (23), a glass is provided. The glass comprises: greater than or equal to 45 mol % to less than or equal to 75 mol % $SiO_2$; greater than or equal to 3 mol % to less than or equal to 20 mol % $Al_2O_3$; greater than or equal to 4 mol % to less than or equal to 15 mol % $P_2O_5$; and greater than or equal to 11 mol % to less than or equal to 25 mol % $K_2O$.

In aspect (24), the glass of aspect (23) is provided, comprising: greater than or equal to 55 mol % to less than or equal to 69 mol % $SiO_2$; greater than or equal to 5 mol % to less than or equal to 15 mol % $Al_2O_3$; greater than or equal to 5 mol % to less than or equal to 10 mol % $P_2O_5$; and greater than or equal to 11 mol % to less than or equal to 20 mol % $K_2O$.

In aspect (25), the glass of aspect (23) or (24) is provided, further comprising: greater than or equal to 0 mol % to less than or equal to 10 mol % $Cs_2O$; and greater than or equal to 0 mol % to less than or equal to 10 mol % $Rb_2O$.

In aspect (26), the glass of any of aspects (23) to (25) is provided, wherein the glass is substantially free of lithium.

In aspect (27), the glass of any of aspects (23) to (26) is provided, wherein the glass is substantially free of sodium.

In aspect (28), the glass of any of aspects (23) to (27) is provided, comprising: greater than or equal to 58 mol % to less than or equal to 63 mol % $SiO_2$; greater than or equal to 7 mol % to less than or equal to 14 mol % $Al_2O_3$; greater than or equal to 7 mol % to less than or equal to 10 mol % $P_2O_5$; and greater than or equal to 15 mol % to less than or equal to 20 mol % $K_2O$.

In aspect (29), the glass of any of aspects (23) to (28) is provided, wherein the glass has a Vicker's crack initiation threshold of greater than or equal to 5 kgf.

In aspect (30), the glass of any of aspects (23) to (29) is provided, further comprising at least one of $Li_2O$, $Na_2O$, $Cs_2O$, and $Rb_2O$.

In aspect (31), a method is provided. The method comprises: exposing a glass-based substrate to an environment with a relative humidity of greater than or equal to 75% to form glass-based article with a hydrogen-containing layer extending from a surface of the glass-based article to a depth of layer. The glass-based substrate includes $SiO_2$, $Al_2O_3$, and $P_2O_5$. A hydrogen concentration of the hydrogen-containing layer decreases from a maximum hydrogen concentration to the depth of layer, and the depth of layer is greater than 5 µm.

In aspect (32), the method of aspect (31) is provided, wherein the glass-based substrate has a composition comprising: greater than or equal to 55 mol % to less than or equal to 69 mol % $SiO_2$; greater than or equal to 5 mol % to less than or equal to 15 mol % $Al_2O_3$; greater than or equal to 6 mol % to less than or equal to 10 mol % $P_2O_5$; and greater than or equal to 10 mol % to less than or equal to 20 mol % $K_2O$.

In aspect (33), the method of aspect (31) is provided, wherein the glass-based substrate has a composition comprising: greater than or equal to 45 mol % to less than or equal to 75 mol % $SiO_2$; greater than or equal to 3 mol % to less than or equal to 20 mol % $Al_2O_3$; greater than or equal to 4 mol % to less than or equal to 15 mol % $P_2O_5$; and greater than or equal to 11 mol % to less than or equal to 25 mol % $K_2O$.

In aspect (34), the method of aspect (31) is provided, wherein the glass-based substrate has a composition comprising: greater than or equal to 45 mol % to less than or equal to 75 mol % $SiO_2$; greater than or equal to 3 mol % to less than or equal to 20 mol % $Al_2O_3$; greater than or equal to 6 mol % to less than or equal to 15 mol % $P_2O_5$; and greater than or equal to 6 mol % to less than or equal to 25 mol % $K_2O$.

In aspect (35), the method of any of aspects (31) to (34) is provided, wherein the glass-based substrate further comprises: greater than or equal to 0 mol % to less than or equal to 10 mol % $Cs_2O$; and greater than or equal to 0 mol % to less than or equal to 10 mol % $Rb_2O$.

In aspect (36), the method of any of aspects (31) to (35) is provided, further comprising at least one of $Li_2O$, $Na_2O$, $Cs_2O$, and $Rb_2O$.

In aspect (37), the method of any of aspects (31) to (36) is provided, wherein the glass-based substrate is substantially free of at least one of lithium and sodium.

In aspect (38), the method of any of aspects (31) to (37) is provided, wherein the exposing takes place at a temperature of greater than or equal to 70° C.

In aspect (39), the method of any of aspects (31) to (38) is provided, wherein the glass-based article has a Vicker's crack initiation threshold of greater than or equal to 1 kgf.

These and other aspects, advantages, and salient features will become apparent from the following detailed description, the accompanying drawings, and the appended claims.

BRIEF DESCRIPTION OF THE DRAWINGS

FIG. 6 is a photograph of a Vickers indent at 5 kgf in a glass-based article formed by exposing a glass-based substrate having the composition of Example 1 to a water containing environment.

FIG. 7 is a photograph of a Vickers indent at 10 kgf in a glass-based article formed by exposing a glass-based substrate having the composition of Example 1 to a water containing environment.

FIG. 8 is a photograph of a Vickers indent at 20 kgf in a glass-based article formed by exposing a glass-based substrate having the composition of Example 1 to a water containing environment.

DETAILED DESCRIPTION

Figure 1:
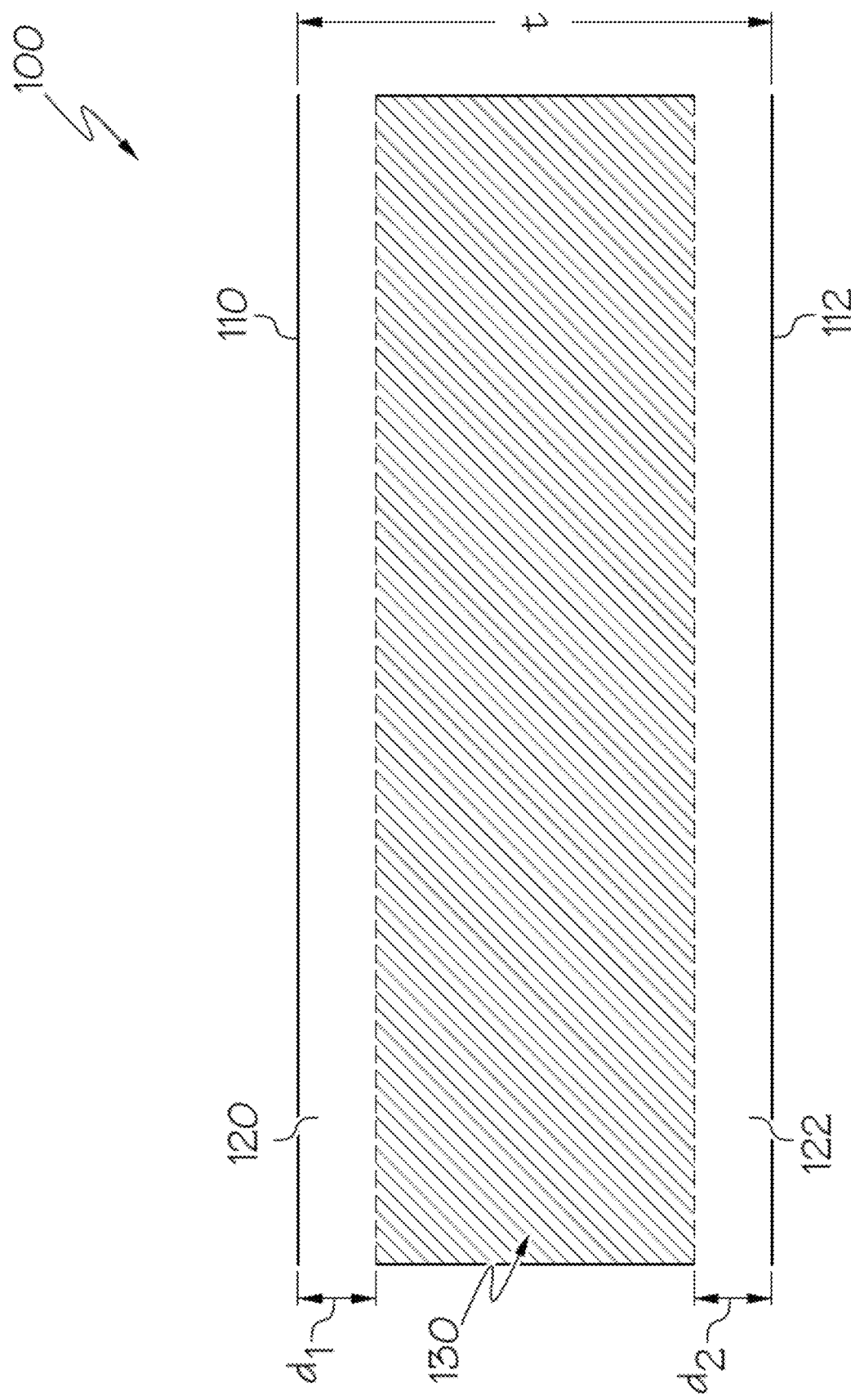
FIG. 1 is a representation of a cross-section of a glass-based article according to an embodiment.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. Unless otherwise specified, a range of values, when recited, includes both the upper and lower limits of the range as well as any sub-ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the term "glass-based" is used in its broadest sense to include any objects made wholly or partly of glass, including glass ceramics (which include a crystalline phase and a residual amorphous glass phase). Unless otherwise specified, all compositions of the glasses described herein are expressed in terms of mole percent (mol %), and the constituents are provided on an oxide basis. Unless otherwise specified, all temperatures are expressed in terms of degrees Celsius (° C.).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. For example, a glass that is "substantially free of $K_2O$" is one in which $K_2O$ is not actively added or batched into the glass, but may be present in very small amounts as a contaminant, such as in amounts of less than about 0.01 mol %. As utilized herein, when the term "about" is used to modify a value, the exact value is also disclosed. For example, the term "greater than about 10 mol %" also discloses "greater than or equal to 10 mol %."

Reference will now be made in detail to various embodiments, examples of which are illustrated in the accompanying examples and drawings.

The glass-based articles disclosed herein include a hydrogen-containing layer extending from a surface of the article to a depth of layer. The hydrogen-containing layer includes a hydrogen concentration that decreases from a maximum hydrogen concentration of the glass-based article to the depth of layer. In some embodiments, the maximum hydrogen concentration may be located at the surface of the glass-based article. The glass-based articles exhibit a high Vickers indentation cracking threshold (e.g., greater than or equal to 1 kgf), without the use of traditional strengthening methods (for example, ion-exchange of a pair of alkali ions or thermal tempering). The high Vickers indentation cracking thresholds exhibited by the glass-based articles signify a high resistance to damage.

The glass-based articles may be formed by exposing glass-based substrates to environments containing water vapor, thereby allowing hydrogen species to penetrate the glass-based substrates and form the glass-based articles having a hydrogen-containing layer. As utilized herein, hydrogen species includes molecular water, hydroxyl, hydrogen ions, and hydronium. The composition of the glass-based substrates may be selected to promote the interdiffusion of hydrogen species into the glass. As utilized herein, the term "glass-based substrate" refers to the precursor prior to exposure to a water vapor containing environment for the formation of a glass-based article that includes hydrogen-containing layers. Similarly, the term "glass-based article" refers to the post exposure article that includes a hydrogen-containing layer.

A representative cross-section of a glass-based article 100 according to some embodiments is depicted in FIG. 1. The glass-based article 100 has a thickness t that extends between a first surface 110 and a second surface 112. A first hydrogen-containing layer 120 extends from the first surface 110 to a first depth of layer, where the first depth of layer has a depth $d_1$ measured from the first surface 110 into the glass-based article 100. A second hydrogen-containing layer 122 extends from the second surface 112 to a second depth of layer, where the second depth of layer has a depth $d_2$ measured from the second surface 112 into the glass-based article 100. An added-hydrogen-species free region 130 is present between the first depth of layer and the second depth of layer.

The hydrogen-containing layer of the glass-based articles may have a depth of layer (DOL) greater than 5 μm. In some embodiments, the depth of layer may be greater than or equal to 10 μm, such as greater than or equal to 15 μm, greater than or equal to 20 μm, greater than or equal to 25 μm, greater than or equal to 30 μm, greater than or equal to 35 μm, greater than or equal to 40 μm, greater than or equal to 45 μm, greater than or equal to 50 μm, greater than or equal to 55 μm, greater than or equal to 60 μm, greater than or equal to 65 μm, greater than or equal to 70 μm, greater than or equal to 75 μm, greater than or equal to 80 μm, greater than or equal to 85 μm, greater than or equal to 90 μm, greater than or equal to 95 μm, greater than or equal to 100 μm, greater than or equal to 105 μm, greater than or equal to 110 μm, greater than or equal to 115 μm, greater than or equal to 120 μm, greater than or equal to 125 μm, greater than or equal to 130 μm, greater than or equal to 135 μm, greater than or equal to 140 μm, greater than or equal to 145 μm, greater than or equal to 150 μm, greater than or equal to 155 μm, greater than or equal to 160 μm, greater than or equal to 165 μm, greater than or equal to 170 μm, greater than or equal to 175 μm, greater than or equal to 180 μm, greater than or equal to 185 μm, greater than or equal to 190 μm, greater than or equal to 195 μm, greater than or equal to 200 μm, or more. In some embodiments, the depth of layer may be from greater than 5 μm to less than or equal to 205 μm, such as from greater than or equal to 10 μm to less than or equal to 200 μm, from greater than or equal to 15 μm to less than or equal to 200 μm, from greater than or equal to 20 μm to less than or equal to 195 μm, from greater than or equal to 25 μm to less than or equal to 190 μm, from greater than or equal to 30 μm to less than or equal to 185 μm, from greater than or equal to 35 μm to less than or equal to 180 μm, from greater than or equal to 40 μm to less than or equal to 175 μm, from greater than or equal to 45 μm to less than or equal to 170 μm, from greater than or equal to 50 μm to less than or equal to 165 μm, from greater than or equal to 55 μm to less than or equal to 160 μm, from greater than or equal to 60 µm to less than or equal to 155 µm, from greater than or equal to 65 µm to less than or equal to 150 µm, from greater than or equal to 70 µm to less than or equal to 145 µm, from greater than or equal to 75 µm to less than or equal to 140 µm, from greater than or equal to 80 µm to less than or equal to 135 µm, from greater than or equal to 85 µm to less than or equal to 130 µm, from greater than or equal to 90 µm to less than or equal to 125 µm, from greater than or equal to 95 µm to less than or equal to 120 µm, from greater than or equal to 100 µm to less than or equal to 115 µm, from greater than or equal to 105 µm to less than or equal to 110 µm, or any sub-ranges formed by any of these endpoints. In general, the depth of layer exhibited by the glass-based articles is greater than the depth of layer that may be produced by exposure to the ambient environment.

The hydrogen-containing layer of the glass-based articles may have a depth of layer (DOL) greater than 0.005t, wherein t is the thickness of the glass-based article. In some embodiments, the depth of layer may be greater than or equal to 0.010t, such as greater than or equal to 0.015t, greater than or equal to 0.020t, greater than or equal to 0.025t, greater than or equal to 0.030t, greater than or equal to 0.035t, greater than or equal to 0.040t, greater than or equal to 0.045t, greater than or equal to 0.050t, greater than or equal to 0.055t, greater than or equal to 0.060t, greater than or equal to 0.065t, greater than or equal to 0.070t, greater than or equal to 0.075t, greater than or equal to 0.080t, greater than or equal to 0.085t, greater than or equal to 0.090t, greater than or equal to 0.095t, greater than or equal to 0.10t, greater than or equal to 0.15t, greater than or equal to 0.20t, or more. In some embodiments, the DOL may be from greater than 0.005t to less than or equal to 0.205t, such as from greater than or equal to 0.010t to less than or equal to 0.200t, from greater than or equal to 0.015t to less than or equal to 0.195t, from greater than or equal to 0.020t to less than or equal to 0.190t, from greater than or equal to 0.025t to less than or equal to 0.185t, from greater than or equal to 0.030t to less than or equal to 0.180t, from greater than or equal to 0.035t to less than or equal to 0.175t, from greater than or equal to 0.040t to less than or equal to 0.170t, from greater than or equal to 0.045t to less than or equal to 0.165t, from greater than or equal to 0.050t to less than or equal to 0.160t, from greater than or equal to 0.055t to less than or equal to 0.155t, from greater than or equal to 0.060t to less than or equal to 0.150t, from greater than or equal to 0.065t to less than or equal to 0.145t, from greater than or equal to 0.070t to less than or equal to 0.140t, from greater than or equal to 0.075t to less than or equal to 0.135t, from greater than or equal to 0.080t to less than or equal to 0.130t, from greater than or equal to 0.085t to less than or equal to 0.125t, from greater than or equal to 0.090t to less than or equal to 0.120t, from greater than or equal to 0.095t to less than or equal to 0.115t, from greater than or equal to 0.100t to less than or equal to 0.110t, or any sub-ranges formed by any of these endpoints.

The depth of layer and hydrogen concentration are measured by a secondary ion mass spectrometry (SIMS) technique that is known in the art. The SIMS technique is capable of measuring the hydrogen concentration at a given depth, but is not capable of distinguishing the hydrogen species present in the glass-based article. For this reason, all hydrogen species contribute to the SIMS measured hydrogen concentration. As utilized herein, the depth of layer (DOL) refers to the first depth below the surface of the glass-based article where the hydrogen concentration is equal to the hydrogen concentration at the center of the glass-based article. This definition accounts for the hydrogen concentration of the glass-based substrate prior to treatment, such that the depth of layer refers to the depth of the hydrogen added by the treatment process. As a practical matter, the hydrogen concentration at the center of the glass-based article may be approximated by the hydrogen concentration at the depth from the surface of the glass-based article where the hydrogen concentration becomes substantially constant, as the hydrogen concentration is not expected to change between such a depth and the center of the glass-based article. This approximation allows for the determination of the DOL without measuring the hydrogen concentration throughout the entire depth of the glass-based article.

In some embodiments, the entirety of the thickness of the glass-based article may be part of a hydrogen-containing layer. Such a glass-based article may be produced when the treatment of a glass-based substrate extends for a sufficient time in sufficient conditions for hydrogen species to diffuse to the center of the glass-based article from each exposed surface. In some embodiments, where the surfaces of the glass-based article are exposed to the same treatment conditions a minimum hydrogen concentration may be located at half the thickness of the glass-based article, such that the hydrogen-containing layers meet at the center of the glass-based article. In such embodiments, the DOL may be located at half the thickness of the glass-based articles. In some embodiments, the glass-based articles may not include a region that is free of added hydrogen species. In some embodiments, the glass-based articles may be treated in a humid environment such that the concentration of the added hydrogen species equilibriates throughout the glass-based articles, and the hydrogen concentration does not vary with depth below the surface of the glass-based article. The glass-based articles according to such embodiments would not exhibit a DOL as defined herein, as the hydrogen concentration at the center of the glass-based article would be equivalent to the hydrogen concentration at all other depths.

The glass-based articles are highly resistant to Vickers indentation cracking. The high Vickers indentation cracking resistance imparts a high damage resistance to the glass-based articles. Without wishing to be bound by any particular theory, the water content of the glass-based articles may reduce the local viscosity of the hydrogen-containing layer such that local flow occurs instead of cracking. The Vickers indentation cracking threshold of the glass-based articles is achieved without the use of conventional strengthening techniques, such as the exchange of large alkali ions for smaller alkali ions in the glass, thermal tempering, or lamination of glass layers with a coefficient of thermal expansion mismatch. The glass-based articles exhibit a Vickers indentation cracking threshold of greater than or equal to 1 kgf, such as greater than or equal to 2 kgf, greater than or equal to 3 kgf, greater than or equal to 4 kgf, greater than or equal to 5 kgf, greater than or equal to 6 kgf, greater than or equal to 7 kgf, greater than or equal to 8 kgf, greater than or equal to 9 kgf, greater than or equal to 10 kgf, greater than or equal to 11 kgf, greater than or equal to 12 kgf, greater than or equal to 13 kgf, greater than or equal to 14 kgf, greater than or equal to 15 kgf, greater than or equal to 16 kgf, greater than or equal to 17 kgf, greater than or equal to 18 kgf, greater than or equal to 19 kgf, greater than or equal to 20 kgf, greater than or equal to 21 kgf, greater than or equal to 22 kgf, greater than or equal to 23 kgf, greater than or equal to 24 kgf, greater than or equal to 25 kgf, greater than or equal to 26 kgf, greater than or equal to 27 kgf, greater than or equal to 28 kgf, greater than or equal to 29 kgf, greater than or equal to 30 kgf, or more. In some embodiments, the glass-based articles exhibit a Vickers indentation cracking threshold from greater than or equal to 1 kgf to less than or equal to 30 kgf, such as from greater than or equal to 2 kgf to less than or equal to 29 kgf, from greater than or equal to 3 kgf to less than or equal to 28 kgf, from greater than or equal to 4 kgf to less than or equal to 27 kgf, from greater than or equal to 5 kgf to less than or equal to 26 kgf, from greater than or equal to 6kgf to less than or equal to 25 kgf, from greater than or equal to 7 kgf to less than or equal to 24 kgf, from greater than or equal to 8 kgf to less than or equal to 23 kgf, from greater than or equal to 9 kgf to less than or equal to 22 kgf, from greater than or equal to 10 kgf to less than or equal to 21 kgf, from greater than or equal to 11 kgf to less than or equal to 20 kgf, from greater than or equal to 12 kgf to less than or equal to 19 kgf, from greater than or equal to 13 kgf to less than or equal to 18 kgf, from greater than or equal to 14 kgf to less than or equal to 17 kgf, from greater than or equal to 15 kgf to less than or equal to 16 kgf, or any sub-ranges formed by any of these endpoints.

Vickers crack initiation threshold (or Indentation Fracture Threshold) was measured by a Vickers indenter. Vickers crack initiation threshold is a measure of indentation damage resistance of the glass. The test involved the use of a square-based pyramidal diamond indenter with an angle of 136° between faces, referred to as a Vickers indenter. The Vickers indenter was the same as the one used in standard micro hardness testing (as described in ASTM-E384-11). A minimum of five specimens were chosen to represent the glass type and/or sample of interest. For each specimen, multiple sets of five indentations were introduced to the specimen surface. Each set of five indentations was introduced at a given load, with each individual indentation separated by a minimum of 5 mm and no closer than 5 mm to a specimen edge. A rate of indenter loading/unloading of 50 kg/minute was used for test loads ≥2 kg. For test loads <2 kg, a rate of 5 kg/minute was used. A dwell (i.e., hold) time of 10 seconds at the target load was utilized. The machine maintained load control during the dwell period. After a period of at least 12 hours, the indentations were inspected under reflected light using a compound microscope at 500× magnification. The presence or absence of median/radial cracks (cracks extending from the indentation along a plane perpendicular to the major plane of the article), or specimen fracture, was then noted for each indentation. Note that the formation of lateral cracks (cracks extending along a plane parallel to the major plane of the article) was not considered indicative of exhibiting threshold behavior, since the formation of median/radial cracks was of interest, or specimen fracture, for this test. The specimen threshold value is defined as the midpoint of the lowest consecutive indentation loads which bracket greater than 50% of the individual indentations meeting threshold. For example, if within an individual specimen, 2 of the 5 (40%) indentations induced at a 5 kg load have exceeded threshold, and 3 of the 5 (60%) indentations induced at a 6 kg load have exceeded threshold, then the specimen threshold value would be defined as greater than 5 kg. The range (lowest value to highest value) of all the specimen midpoints may also be reported for each sample. The pre-test, test and post-test environment was controlled to 23±2° C. and 50±5% RH to minimize variation in the fatigue (stress corrosion) behavior of the specimens.

Without wishing to be bound by any particular theory, the hydrogen-containing layer of the glass-based articles may be the result of an interdiffusion of hydrogen species for ions contained in the compositions of the glass-based substrate. Monovalent hydrogen-containing species, such as $H_3O^+$ and/or $H^+$, may replace alkali ions contained in the glass-based substrate composition to form the glass-based article. The size of the alkali ions that the hydrogen-containing species replaces contributes to the diffusivity of the hydrogen-containing species in the glass-based substrate, as larger alkali ions produce larger interstitial spaces that facilitate the interdiffusion mechanism. For example, the hydronium ion ($H_3O^+$) has an ionic radius that is close to the ionic radius of potassium, and much larger than the ionic radius of lithium. It was observed that the diffusivity of the hydrogen-containing species in the glass-based substrate is significantly higher, by two orders of magnitude, when the glass-based substrate contains potassium than when the glass-based substrate contains lithium. This observed behavior may also indicate that the hydronium ion is the primary monovalent hydrogen-containing species that diffuses into the glass-based substrate. The ionic radii for the alkali ions and the hydronium ion are reported in Table I below. As shown in Table I, rubidium and cesium have ionic radii that are significantly larger than the hydronium ion, which may result in higher hydrogen diffusivities than those observed for potassium.

TABLE I

| Ion | Radius (nm) |
|---|---|
| Lithium | 0.059 |
| Sodium | 0.099 |
| Potassium | 0.133 |
| Hydronium | 0.137 |
| Rubidium | 0.152 |
| Cesium | 0.167 |

In some embodiments, the replacement of alkali ions in the glass-based substrate with the hydrogen-containing ions may produce a compressive stress layer extending from the surface of the glass-based article into the glass-based article to a depth of compression. As used herein, depth of compression (DOC) means the depth at which the stress in the glass-based article changes from compressive to tensile. Thus, the glass-based article also contains a tensile stress region having a maximum central tension (CT), such that the forces within the glass-based article are balanced. Without wishing to be bound by any theory, the compressive stress region may be the result of the exchange of hydrogen-containing ions with an ionic radius that is larger than the ions which they replace.

In some embodiments, the compressive stress layer may include a compressive stress of at greater than or equal to 100 MPa, such as greater than or equal to 105 MPa, greater than or equal to 110 MPa, greater than or equal to 115 MPa, greater than or equal to 120 MPa, greater than or equal to 125 MPa, greater than or equal to 130 MPa, abo greater than or equal to ut 135 MPa, or more. In some embodiments, the compressive stress layer may include a compressive stress of from greater than or equal to 100 MPa to less than or equal to 150 MPa, such as from greater than or equal to 105 MPa to less than or equal to 145 MPa, from greater than or equal to 110 MPa to less than or equal to 140 MPa, from greater than or equal to 115 MPa to less than or equal to 135 MPa, from greater than or equal to 120 MPa to less than or equal to 130 MPa, 125 MPa, or any sub-ranges formed from any of these endpoints.

In some embodiments, the DOC of the compressive stress layer may be greater than or equal to 75 μm, such as greater than or equal to 80 μm, greater than or equal to 85 μm, greater than or equal to 90 µm, greater than or equal to 95 µm, greater than or equal to 100 µm, or more. In some embodiments, the DOC of the compressive stress layer may be at from greater than or equal to 75 µm to less than or equal to 115 µm, such as from greater than or equal to 80 µm to less than or equal to 110 µm, from greater than or equal to 85 µm to less than or equal to 105 µm, from greater than or equal to 90 µm to less than or equal to 100 µm, 95 µm, or any sub-ranges that may be formed from any of these endpoints.

In some embodiments, the glass-based articles may have a DOC greater than or equal to 0.05t, wherein t is the thickness of the glass-based article, such as greater than or equal to 0.06t, greater than or equal to 0.07t, greater than or equal to 0.08t, greater than or equal to 0.09t, greater than or equal to 0.10t, greater than or equal to 0.11t, greater than or equal to 0.12t, or more. In some embodiments, the glass-based articles may have a DOC from greater than or equal to 0.05t to less than or equal to 0.20t, such as from greater than or equal to 0.06t to less than or equal to 0.19t, from greater than or equal to 0.07t to less than or equal to 0.18t, from greater than or equal to 0.08t to less than or equal to 0.17t, from greater than or equal to 0.09t to less than or equal to 0.16t, from greater than or equal to 0.10t to less than or equal to 0.15t, from greater than or equal to 0.11t to less than or equal to 0.14t, from greater than or equal to 0.12t to less than or equal to 0.13t, or any sub-ranges formed from any of these endpoints.

In some embodiments, the CT of the glass-based article may be greater than or equal to 10 MPa, such as greater than or equal to 11 MPa, greater than or equal to 12 MPa, greater than or equal to 13 MPa, greater than or equal to 14 MPa, greater than or equal to 15 MPa, greater than or equal to 16 MPa, greater than or equal to 17 MPa, greater than or equal to 18 MPa, greater than or equal to 19 MPa, greater than or equal to 20 MPa, greater than or equal to 22 MPa, greater than or equal to 24 MPa, greater than or equal to 26 MPa, greater than or equal to 28 MPa, greater than or equal to 30 MPa, greater than or equal to 32 MPa, or more. In some embodiments, the CT of the glass-based article may be from greater than or equal to 10 MPa to less than or equal to 35 MPa, such as from greater than or equal to 11 MPa to less than or equal to 34 MPa, from greater than or equal to 12 MPa to less than or equal to 33 MPa, from greater than or equal to 13 MPa to less than or equal to 32 MPa, from greater than or equal to 14 MPa to less than or equal to 32 MPa, from greater than or equal to 15 MPa to less than or equal to 31 MPa, from greater than or equal to 16 MPa to less than or equal to 30 MPa, from greater than or equal to 17 MPa to less than or equal to 28 MPa, from greater than or equal to 18 MPa to less than or equal to 26 MPa, from greater than or equal to 19 MPa to less than or equal to 24 MPa, from greater than or equal to 20 MPa to less than or equal to 22 MPa, or any sub-ranges formed from any of these endpoints.

Compressive stress (including surface CS) is measured by surface stress meter using commercially available instruments such as the FSM-6000 (FSM), manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety. DOC is measured by FSM. The maximum central tension (CT) values are measured using a scattered light polariscope (SCALP) technique known in the art.

The glass-based articles may be formed from glass-based substrates having any appropriate composition. The composition of the glass-based substrate may be specifically selected to promote the diffusion of hydrogen-containing species, such that a glass-based article including a hydrogen-containing layer may be formed efficiently. In some embodiments, the glass-based substrates may have a composition that includes $SiO_2$, $Al_2O_3$, and $P_2O_5$. In some embodiments, the glass-based substrates may additionally include an alkali metal oxide, such as at least one of $Li_2O$, $Na_2O$, $K_2O$, $Rb_2O$, and $Cs_2O$. In some embodiments, the glass-based substrates may be substantially free, or free, of at least one of lithium and sodium. In some embodiments, after the diffusion of the hydrogen-containing species into the glass-based substrate, the glass-based article may have a bulk composition that is approximately the same as the composition of the glass-based substrate. In some embodiments, the hydrogen species may not diffuse to the center of the glass-based article. Stated differently, the center of the glass-based article is the area least affected by the water vapor treatment. For this reason, the center of the glass-based article may have a composition that is substantially the same, or the same, as the composition of the glass-based substrate prior to treatment in a water containing environment.

The glass-based substrate may include any appropriate amount of $SiO_2$. $SiO_2$ is the largest constituent and, as such, $SiO_2$ is the primary constituent of the glass network formed from the glass composition. If the concentration of $SiO_2$ in the glass composition is too high, the formability of the glass composition may be diminished as higher concentrations of $SiO_2$ increase the difficulty of melting the glass, which, in turn, adversely impacts the formability of the glass. In some embodiments, the glass-based substrate may include $SiO_2$ in an amount from greater than or equal to 45 mol % to less than or equal to 75 mol %, such as from greater than or equal to 46 mol % to less than or equal to 74 mol %, from greater than or equal to 47 mol % to less than or equal to 73 mol %, from greater than or equal to 48 mol % to less than or equal to 72 mol %, from greater than or equal to 49 mol % to less than or equal to 71 mol %, from greater than or equal to 50 mol % to less than or equal to 70 mol %, from greater than or equal to 51 mol % to less than or equal to 69 mol %, from greater than or equal to 52 mol % to less than or equal to 68 mol %, from greater than or equal to 53 mol % to less than or equal to 67 mol %, from greater than or equal to 54 mol % to less than or equal to 66 mol %, from greater than or equal to 55 mol % to less than or equal to 65 mol %, from greater than or equal to 56 mol % to less than or equal to 64 mol %, from greater than or equal to 57 mol % to less than or equal to 63 mol %, from greater than or equal to 58 mol % to less than or equal to 62 mol %, from greater than or equal to 59 mol % to less than or equal to 61 mol %, 60 mol %, or any sub-ranges formed by any of these endpoints. In some embodiments, the glass-based substrate may include $SiO_2$ in an amount from greater than or equal to 55 mol % to less than or equal to 69 mol %, such as from greater than or equal to 58 mol % to less than or equal to 63 mol %, or any sub-ranges formed from any of these endpoints.

The glass-based substrate may include any appropriate amount of $Al_2O_3$. $Al_2O_3$ may serve as a glass network former, similar to $SiO_2$. $Al_2O_3$ may increase the viscosity of the glass composition due to its tetrahedral coordination in a glass melt formed from a glass composition, decreasing the formability of the glass composition when the amount of $Al_2O_3$ is too high. However, when the concentration of Al$_2$O$_3$ is balanced against the concentration of SiO$_2$ and the concentration of alkali oxides in the glass composition, Al$_2$O$_3$ can reduce the liquidus temperature of the glass melt, thereby enhancing the liquidus viscosity and improving the compatibility of the glass composition with certain forming processes, such as the fusion forming process. The inclusion of Al$_2$O$_3$ in the glass-based substrate prevents phase separation and reduces the number of non-bridging oxygens (NBOs) in the glass. Additionally, Al$_2$O$_3$ can improve the effectiveness of ion exchange. In some embodiments, the glass-based substrate may include Al$_2$O$_3$ in an amount of from greater than or equal to 3 mol % to less than or equal to 20 mol %, such as from greater than or equal to 4 mol % to less than or equal to 19 mol %, from greater than or equal to 5 mol % to less than or equal to 18 mol %, from greater than or equal to 6 mol % to less than or equal to 17 mol %, from greater than or equal to 7 mol % to less than or equal to 16 mol %, from greater than or equal to 8 mol % to less than or equal to 15 mol %, from greater than or equal to 9 mol % to less than or equal to 14 mol %, from greater than or equal to 10 mol % to less than or equal to 13 mol %, from greater than or equal to 11 mol % to less than or equal to 12 mol %, or any sub-ranges formed by any of these endpoints. In some embodiments, the glass-based substrate may include Al$_2$O$_3$ in an amount of from greater than or equal to 5 mol % to less than or equal to 15 mol %, such as from greater than or equal to 7 mol % to less than or equal to 14 mol %, or any sub-ranges formed from any of these endpoints.

The glass-based substrate may include any amount of P$_2$O$_5$ sufficient to produce the desired hydrogen diffusivity. The inclusion of phosphorous in the glass-based substrate promotes faster interdiffusion, regardless of the exchanging ionic pair. Thus, the phosphorous containing glass-based substrates allow the efficient formation of glass-based articles including a hydrogen-containing layer. The inclusion of P$_2$O$_5$ also allows for the production of a glass-based article with a deep depth of layer (e.g., greater than about 10 μm) in a relatively short treatment time. In some embodiments, the glass-based substrate may include P$_2$O$_5$ in an amount of from greater than or equal to 4 mol % to less than or equal to 15 mol %, such as from greater than or equal to 5 mol % to less than or equal to 14 mol %, from greater than or equal to 6 mol % to less than or equal to 13 mol %, from greater than or equal to 7 mol % to less than or equal to 12 mol %, from greater than or equal to 8 mol % to less than or equal to 11 mol %, from greater than or equal to 9 mol % to less than or equal to 10 mol %, or any sub-ranges formed by any of these endpoints. In some embodiments, the glass-based substrate may include P$_2$O$_5$ in an amount of from greater than or equal to 5 mol % to less than or equal to 15 mol %, such as from greater than or equal to 6 mol % to less than or equal to 15 mol %, from greater than or equal to 5 mol % to less than or equal to 10 mol %, from greater than or equal to 6 mol % to less than or equal to 10 mol %, from greater than or equal to 7 mol % to less than or equal to 10 mol %, or any sub-ranges formed by any of these endpoints.

The glass-based substrate may include an alkali metal oxide in any appropriate amount The alkali metal oxides promote ion exchange. The sum of the alkali metal oxides (e.g., Li$_2$O, Na$_2$O, and K$_2$O as well as other alkali metal oxides including Cs$_2$O and Rb$_2$O) in the glass composition may be referred to as "R$_2$O", and R$_2$O may be expressed in mol %. In some embodiments, the glass-based substrate may be substantially free, or free, of at least one of lithium and sodium. In embodiments, the glass composition comprises R$_2$O in an amount greater than or equal to 6 mol %, such as greater than or equal to 7 mol %, greater than or equal to 8 mol %, greater than or equal to 9 mol %, greater than or equal to 10 mol %, greater than or equal to 11 mol %, greater than or equal to 12 mol %, greater than or equal to 13 mol %, greater than or equal to 14 mol %, greater than or equal to 15 mol %, greater than or equal to 16 mol %, greater than or equal to 17 mol %, greater than or equal to 18 mol %, greater than or equal to 19 mol %, greater than or equal to 20 mol %, greater than or equal to 21 mol %, greater than or equal to 22 mol %, greater than or equal to abut 23 mol %, or greater than or equal to 24 mol %. In one or more embodiments, the glass composition comprises R$_2$O in an amount less than or equal to 25 mol %, such as less than or equal to 24 mol %, less than or equal to 23 mol %, less than or equal to 22 mol %, less than or equal to 21 mol %, less than or equal to 20 mol %, less than or equal to 19 mol %, less than or equal to 18 mol %, less than or equal to 17 mol %, less than or equal to 16 mol %, less than or equal to 15 mol %, less than or equal to abut 14 mol %, less than or equal to 13 mol %, less than or equal to 12 mol %, less than or equal to 11 mol %, less than or equal to 10 mol %, less than or equal to 9 mol %, less than or equal to 8 mol %, or less than or equal to 7 mol %. It should be understood that, in embodiments, any of the above ranges may be combined with any other range. In some embodiments, the glass composition comprises R$_2$O in an amount from greater than or equal to 6.0 mol % to less than or equal to 25.0 mol %, such as from greater than or equal to 7.0 mol % to less than or equal to 24.0 mol %, from greater than or equal to 8.0 mol % to less than or equal to 23.0 mol %, from greater than or equal to 9.0 mol % to less than or equal to 22.0 mol %, from greater than or equal to 10.0 mol % to less than or equal to 21.0 mol %, from greater than or equal to 11.0 mol % to less than or equal to 20.0 mol %, from greater than or equal to about 12.0 mol % to less than or equal to 19.0 mol %, from greater than or equal to 13.0 mol % to less than or equal to 18.0 mol %, from greater than or equal to 14.0 mol % to less than or equal to 17.0 mol %, or from greater than or equal to 15.0 mol % to less than or equal to 16.0 mol %, and all ranges and sub-ranges between the foregoing values.

In some embodiments, the alkali metal oxide may be K$_2$O. The inclusion of K$_2$O allows the efficient exchange of hydrogen species, into the glass substrate upon exposure to a water containing environment. In embodiments, the glass-based substrate may include K$_2$O in an amount of from greater than or equal to 6 mol % to less than or equal to 25 mol %, such as from greater than or equal to 7 mol % to less than or equal to 24 mol %, from greater than or equal to 8 mol % to less than or equal to 23 mol %, from greater than or equal to 9 mol % to less than or equal to 22 mol %, from greater than or equal to 10 mol % to less than or equal to 21 mol %, from greater than or equal to 11 mol % to less than or equal to 20 mol %, from greater than or equal to 12 mol % to less than or equal to 19 mol %, from greater than or equal to 13 mol % to less than or equal to 18 mol %, from greater than or equal to 14 mol % to less than or equal to 17 mol %, from greater than or equal to 15 mol % to less than or equal to 16 mol %, or any sub-ranges formed from any of these endpoints. In some embodiments, the glass-based substrate may include K$_2$O in an amount of from greater than or equal to 10 mol % to less than or equal to 25 mol %, such as from greater than or equal to 10 mol % to less than or equal to 20 mol %, from greater than or equal to 11 mol % to less than or equal to 25 mol %, from greater than or equal to 11 mol % to less than or equal to 20 mol %, from greater than or equal to 15 mol % to less than or equal to 20 mol %, or any sub-ranges formed from any of these endpoints.

The glass-based substrate may include Rb$_2$O in any appropriate amount. In some embodiments, the glass-based substrate may include Rb$_2$O in an amount of from greater than or equal to 0 mol % to less than or equal to 10 mol %, such as from greater than or equal to 1 mol % to less than or equal to 9 mol %, from greater than or equal to 2 mol % to less than or equal to 8 mol %, from greater than or equal to 3 mol % to less than or equal to 7 mol %, from greater than or equal to 4 mol % to less than or equal to 6 mol %, 5 mol %, or any sub-range formed from any of these endpoints.

The glass-based substrate may include Cs$_2$O in any appropriate amount. In some embodiments, the glass-based substrate may include Cs$_2$O in an amount of from greater than or equal to 0 mol % to less than or equal to 10 mol %, such as from greater than or equal to 1 mol % to less than or equal to 9 mol %, from greater than or equal to 2 mol % to less than or equal to 8 mol %, from greater than or equal to 3 mol % to less than or equal to 7 mol %, from greater than or equal to 4 mol % to less than or equal to 6 mol %, 5 mol %, or any sub-range formed from any of these endpoints.

In some embodiments, the glass-based substrate may have a composition including: from greater than or equal to 45 mol % to less than or equal to 75 mol % SiO$_2$, from greater than or equal to 3 mol % to less than or equal to 20 mol % Al$_2$O$_3$, from greater than or equal to 6 mol % to less than or equal to 15 mol % P$_2$O$_5$, and from greater than or equal to 6 mol % to less than or equal to 25 mol % K$_2$O.

In some embodiments, the glass-based substrate may have a composition including: from greater than or equal to 45 mol % to less than or equal to 75 mol % SiO$_2$, from greater than or equal to 3 mol % to less than or equal to 20 mol % Al$_2$O$_3$, from greater than or equal to 4 mol % to less than or equal to 15 mol % P$_2$O$_5$, and from greater than or equal to 11 mol % to less than or equal to 25 mol % K$_2$O.

In some embodiments, the glass-based substrate may have a composition including: from greater than or equal to 55 mol % to less than or equal to 69 mol % SiO$_2$, from greater than or equal to 5 mol % to less than or equal to 15 mol % Al$_2$O$_3$, from greater than or equal to 6 mol % to less than or equal to 10 mol % P$_2$O$_5$, and from greater than or equal to 10 mol % to less than or equal to 20 mol % K$_2$O.

In some embodiments, the glass-based substrate may have a composition including: from greater than or equal to 55 mol % to less than or equal to 69 mol % SiO$_2$, from greater than or equal to 5 mol % to less than or equal to 15 mol % Al$_2$O$_3$, from greater than or equal to 5 mol % to less than or equal to 10 mol % P$_2$O$_5$, and from greater than or equal to 11 mol % to less than or equal to 20 mol % K$_2$O.

In some embodiments, the glass-based substrate may have a composition including: from greater than or equal to 58 mol % to less than or equal to 63 mol % SiO$_2$, from greater than or equal to 7 mol % to less than or equal to 14 mol % Al$_2$O$_3$, from greater than or equal to 7 mol % to less than or equal to 10 mol % P$_2$O$_5$, and from greater than or equal to 15 mol % to less than or equal to 20 mol % K$_2$O.

In some embodiments, the glass-based substrate may exhibit a Vickers crack initiation threshold of greater than or equal to 5 kgf, such as greater than or equal to 6 kgf, greater than or equal to 7 kgf, greater than or equal to 8 kgf, greater than or equal to 9 kgf, greater than or equal to 10 kgf, or more.

The glass-based substrate may have any appropriate geometry. In some embodiments, the glass-based substrate may have a thickness of less than or equal to 2 mm, such as less than or equal to 1 mm, less than or equal to 900 µm, less than or equal to 800 µm, less than or equal to 700 µm, less than or equal to 600 µm, less than or equal to 500 µm, less than or equal to 400 µm, less than or equal to 300 µm, or less. In some embodiments, the glass-based substrate may have be plate or sheet shaped. In some other embodiments, the glass-based substrates may have a 2.5D or 3D shape. As utilized herein, a "2.5D shape" refers to a sheet shaped article with at least one major surface being at least partially nonplanar, and a second major surface being substantially planar. As utilized herein, a "3D shape" refers to an article with first and second opposing major surfaces that are at least partially nonplanar.

The glass-based articles may be produced from the glass-based substrate by exposure to water vapor under any appropriate conditions. The exposure may be carried out in any appropriate device, such as a furnace with relative humidity control. In some embodiments, the glass-based substrates may be exposed to an environment with a relative humidity of greater than or equal to 75%, such as greater than or equal to 80%, greater than or equal to 85%, greater than or equal to 90%, greater than or equal to 95%, greater than or equal to 99%, or more. In some embodiments, the glass-based substrate may be exposed to an environment with 100% relative humidity.

In some embodiments, the glass-based substrates may be exposed to an environment at a temperature of greater than or equal to 70° C., such as greater than or equal to 75° C., greater than or equal to 80° C., greater than or equal to 85° C., greater than or equal to 90° C., greater than or equal to 95° C., greater than or equal to 100° C., greater than or equal to 105° C., greater than or equal to 110° C., greater than or equal to 115° C., greater than or equal to 120° C., greater than or equal to 125° C., greater than or equal to 130° C., greater than or equal to 135° C., greater than or equal to 140° C., greater than or equal to 145° C., greater than or equal to 150° C., greater than or equal to 155° C., greater than or equal to 160° C., greater than or equal to 160° C., greater than or equal to 165° C., greater than or equal to 170° C., greater than or equal to 175° C., greater than or equal to 180° C., greater than or equal to 185° C., greater than or equal to 190° C., greater than or equal to 195° C., greater than or equal to 200° C., or more. In some embodiments, the glass-based substrates may be exposed to an environment at a temperature from greater than or equal to 70° C. to less than or equal to 210° C., such as from greater than or equal to 75° C. to less than or equal to 205° C., from greater than or equal to 80° C. to less than or equal to 200° C., from greater than or equal to 85° C. to less than or equal to 195° C., from greater than or equal to 90° C. to less than or equal to 190° C., from greater than or equal to 95° C. to less than or equal to 185° C., from greater than or equal to 100° C. to less than or equal to 180° C., from greater than or equal to 105° C. to less than or equal to 175° C., from greater than or equal to 110° C. to less than or equal to 170° C., from greater than or equal to 115° C. to less than or equal to 165° C., from greater than or equal to 120° C. to less than or equal to 160° C., from greater than or equal to 125° C. to less than or equal to 155° C., from greater than or equal to 130° C. to less than or equal to 150° C., from greater than or equal to 135° C. to less than or equal to 145° C., 140° C., or any sub-ranges formed from these endpoints.

In some embodiments, the glass-based substrate may be exposed to the water vapor containing environment for a time period sufficient to produce the desired degree of hydrogen-containing species diffusion and the desired depth of layer. In some embodiments, the glass-based substrate may be exposed to the water vapor containing environment for greater than or equal to 1 day, such as greater than or equal to 2 days, greater than or equal to 3 days, greater than or equal to 4 days, greater than or equal to 5 days, greater than or equal to 6 days, greater than or equal to 7 days, greater than or equal to 8 days, greater than or equal to 9 days, greater than or equal to 10 days, greater than or equal to 15 days, greater than or equal to 20 days, greater than or equal to 25 days, greater than or equal to 30 days, greater than or equal to 35 days, greater than or equal to 40 days, greater than or equal to 45 days, greater than or equal to 50 days, greater than or equal to 55 days, greater than or equal to 60 days, greater than or equal to 65 days, or more. In some embodiments, the glass-based substrate may be exposed to the water vapor containing environment for a time period from greater than or equal to 1 day to less than or equal to 70 days, such as from greater than or equal to 2 days to less than or equal to 65 days, from greater than or equal to 3 days to less than or equal to 60 days, from greater than or equal to 4 days to less than or equal to 55 days, from greater than or equal to 5 days to less than or equal to 45 days, from greater than or equal to 6 days to less than or equal to 40 days, from greater than or equal to 7 days to less than or equal to 35 days, from greater than or equal to 8 days to less than or equal to 30 days, from greater than or equal to 9 days to less than or equal to 25 days, from greater than or equal to 10 days to less than or equal to 20 days, 15 days, or any sub-ranges formed from any of these endpoints. The exposure conditions may be modified to reduce the time necessary to produce the desired amount of hydrogen-containing species diffusion into the glass-based substrate. For example, the temperature and/or relative humidity may be increased to reduce the time required to achieve the desired degree of hydrogen-containing species diffusion and depth of layer into the glass-based substrate.

Figure 2A:
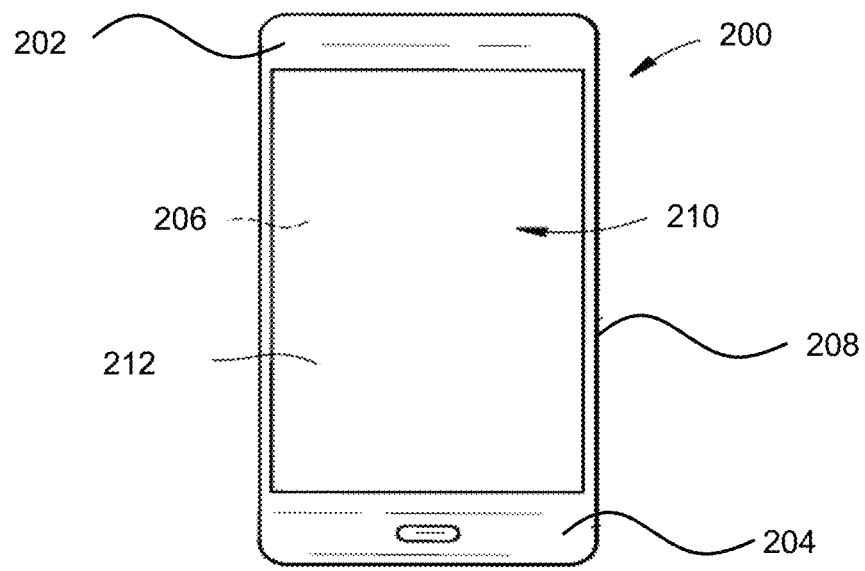
FIG. 2A is a plan view of an exemplary electronic device incorporating any of the glass-based articles disclosed herein.
Figure 2B:
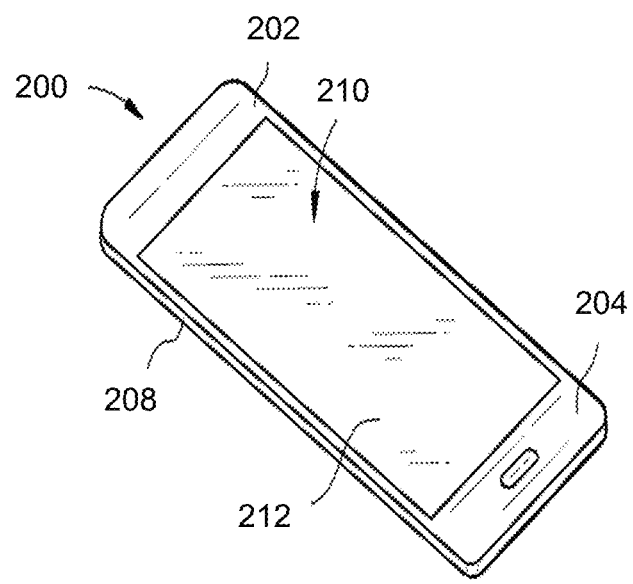
FIG. 2B is a perspective view of the exemplary electronic device of FIG. 2A.

The glass-based articles disclosed herein may be incorporated into another article such as an article with a display (or display articles) (e.g., consumer electronics, including mobile phones, tablets, computers, navigation systems, wearable devices (e.g., watches) and the like), architectural articles, transportation articles (e.g., automotive, trains, aircraft, sea craft, etc.), appliance articles, or any article that requires some transparency, scratch-resistance, abrasion resistance or a combination thereof. An exemplary article incorporating any of the glass-based articles disclosed herein is shown in FIGS. 2A and 2B. Specifically, FIGS. 2A and 2B show a consumer electronic device 200 including a housing 202 having front 204, back 206, and side surfaces 208; electrical components (not shown) that are at least partially inside or entirely within the housing and including at least a controller, a memory, and a display 210 at or adjacent to the front surface of the housing; and a cover substrate 212 at or over the front surface of the housing such that it is over the display. In some embodiments, at least a portion of one of the cover substrate 212 and the housing 202 may include any of the glass-based articles disclosed herein.

Exemplary Embodiments

Glass compositions that are particularly suited for formation of the glass-based articles described herein were formed into glass-based substrates. The compositions of Examples 1-6 are described in Table II below. The density was determined using the buoyancy method of ASTM C693-93 (2013). The linear coefficient of thermal expansion (CTE) over the temperature range 25° C. to 300° C. is expressed in terms of $10^{-7}$/° C. and was determined using a push-rod dilatometer in accordance with ASTM E228-11. The strain point and anneal point were determined using the beam bending viscosity method of ASTM C598-93 (2013). The softening point was determined using the parallel plate viscosity method of ASTM C1351M-96 (2012). The temperatures where the glass had a viscosity of 200 P, 35,000 P, and 200,000 P were measured for the produced compositions in accordance with ASTM C965-96 (2012), titled "Standard Practice for Measuring Viscosity of Glass Above the Softening Point."

TABLE II

| Composition (mol %) | Ex. 1 | Ex. 2 | Ex. 3 | Ex. 4 | Ex. 5 | Ex. 6 |
| --- | --- | --- | --- | --- | --- | --- |
| $SiO_2$ | 60.67 | 60.73 | 60.69 | 61.03 | 61.5 | 61.15 |
| $Al_2O_3$ | 10.81 | 12.85 | 8.91 | 10.89 | 10.89 | 10.9 |
| $P_2O_5$ | 9.86 | 7.9 | 11.77 | 9.65 | 9.22 | 9.51 |
| $K_2O$ | 18.66 | 18.52 | 18.63 | 18.43 | 18.39 | 18.44 |
| Density (g/cm³) | 2.375 | 2.385 | 2.362 | 2.375 | 2.376 | 2.376 |
| CTE ($10^{-7}$/° C.) | 110.8 | 104.8 | 118.5 | 110 | 110.3 | 110 |
| Strain Point (° C.) | 540 | 596 | | 532 | 530 | 538 |
| Anneal Point (° C.) | 592 | 657 | | 584 | 584 | 592 |
| Softening Point (° C.) | 892.2 | 959.8 | 885.2 | 888.4 | 902.6 | 892.3 |
| 200 P Temperature (° C.) | 1687 | 1766 | 1686 | | | |
| 35,000 P Temperature (° C.) | 1219 | 1290 | 1155 | | | |
| 200,000 P Temperature (° C.) | 1112 | 1184 | 1055 | | | |

A glass-based substrate including the composition of Example 1 and having a thickness of 1 mm was exposed to an environment of 85% relative humidity for 65 days to form a glass-based article including a hydrogen-containing layer of the type described herein.

Figure 3:
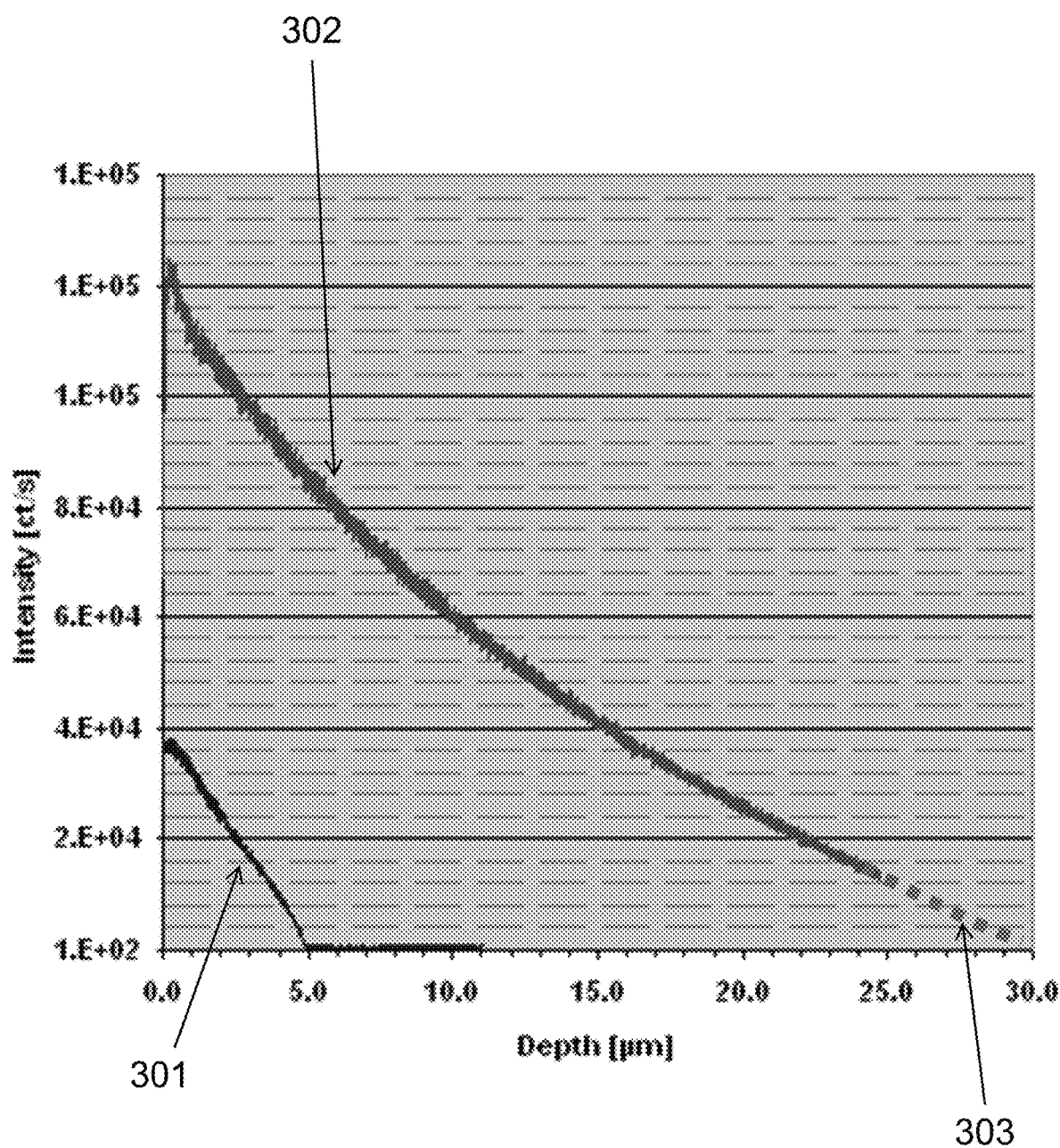
FIG. 3 is a measurement of hydrogen concentration as a function of depth below the surface produced by SIMS for a glass-based article formed from a glass-based substrate having a composition of Example 1.

The depth of the hydrogen-containing layer was measured by SIMS before and after exposure. The result of the SIMS hydrogen concentration measurement is shown in FIG. 3, with the as-received glass-based substrate hydrogen concentration curve 301 having a depth of layer of about 5 μm and the glass-based article hydrogen concentration curve 302 having a depth of layer of about 30 μm. The post-exposure glass-based article was measured to a depth of about 25 μm, and the curve extrapolated 303 to determine the depth of layer. The hydrogen diffusivity (D) was calculated based on the measured values using the general formula DOL=sqrt (D·time).

Figure 5:
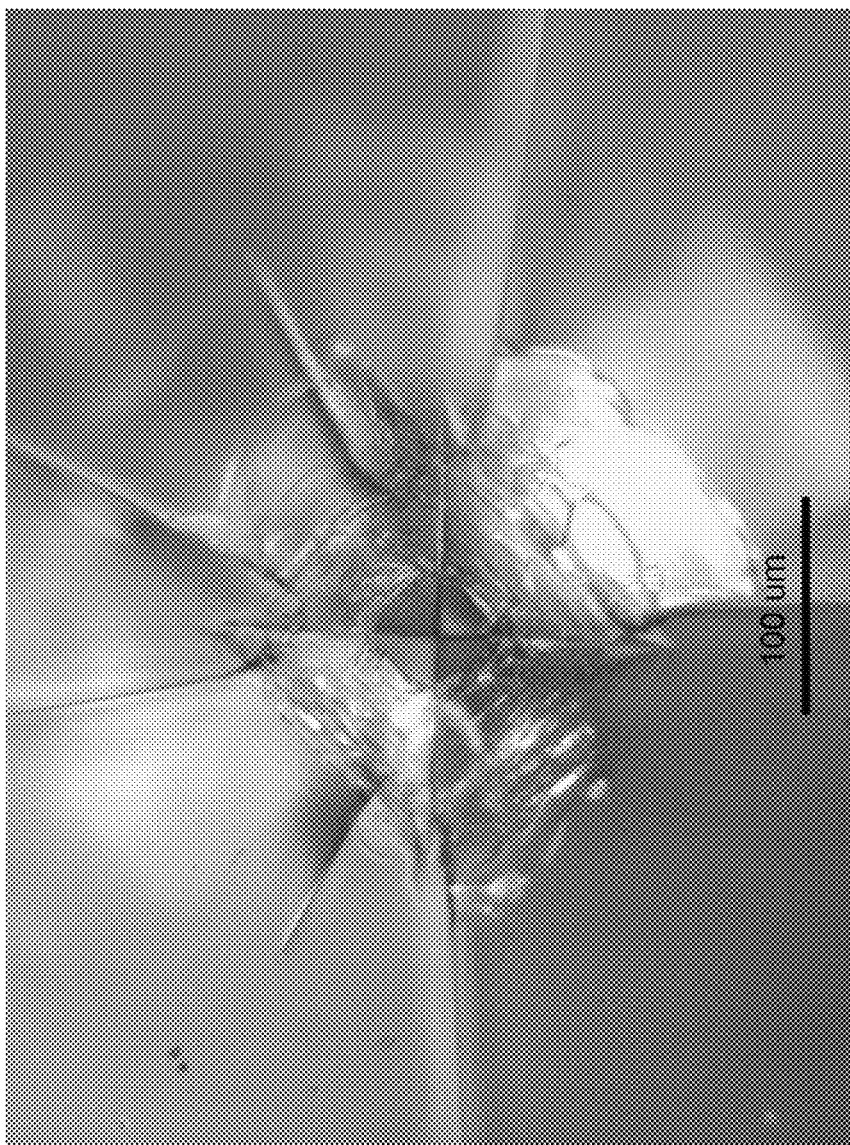
FIG. 5 is a photograph of a Vickers indent at 10 kgf in a glass-based substrate having the composition of Example 1 prior to exposure to a water containing environment.
Figure 4:
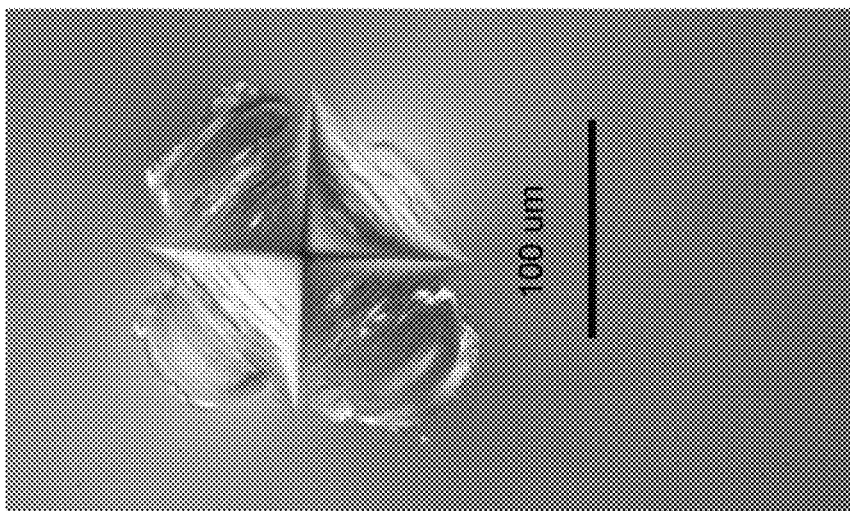
FIG. 4 is a photograph of a Vickers indent at 5 kgf in a glass-based substrate having the composition of Example 1 prior to exposure to a water containing environment.

The Vickers indentation cracking threshold was measured before and after exposure to the water vapor containing environment. The result of the Vickers indentation of the preexposure glass-based substrate is shown in FIGS. 4 and 5, after indentation at 5 kgf and 10 kgf, respectively. As shown in FIGS. 4 and 5, the glass-based substrate had a Vickers crack initiation threshold above 5 kgf but below 10 kgf. The result of the Vickers indentation of the exposed glass-based article is shown in FIGS. 6, 7, and 8, after indentation at 5 kgf, 10 kgf, and 20 kgf, respectively. As demonstrated by FIGS. 6, 7, and 8, the Vickers indentation cracking threshold of the glass-based article was greater than 20 kgf.

Glass-based substrates including compositions of Comparative Examples 1 to 3 and having a thickness of 1 mm were also prepared and exposed to an environment of 85% relative humidity for 30 days. The compositions of Comparative Examples 1 to 3 are reported in Table III below. The Vickers indentation cracking threshold was measured before and after exposure to the water vapor containing environment, and the depth of the hydrogen-containing layer was measured by SIMS after exposure. The hydrogen diffusivity was calculated based on the measured values.

TABLE III

| Composition (mol %) | Ex. 1 | Comp. Ex. 1 | Comp. Ex. 2 | Comp. Ex. 3 |
|---|---|---|---|---|
| $SiO_2$ | 60.67 | 70.05 | 70.43 | 72.44 |
| $Al_2O_3$ | 10.81 | 9.98 | 10 | 8.18 |
| $P_2O_5$ | 9.86 | 0 | 0 | 0 |
| $Li_2O$ | 0 | 19.97 | 0 | 0 |
| $Na_2O$ | 0 | 0 | 19.57 | 0 |
| $K_2O$ | 18.66 | 0 | 0 | 19.38 |
| Vickers Indentation Threshold-as received (kgf) | 5-10 | 1-2 | 0.5-1 | 1-2 |
| Exposure time (days) | 65 | 30 | 30 | 30 |
| Hydrogen DOL (μm) | 25 | 0.2 | 0.34 | 3.7 |
| Hydrogen Diffusivity ($cm^2/s$) | 1.10E-12 | 1.30E-16 | 4.50E-16 | 5.30E-14 |
| Vickers Indentation Threshold-post exposure (kgf) | 20-30 | 1-2 | 0.5-1 | 2-3 |

As shown in Table III, the glass composition of Example 1 exhibited a hydrogen diffusivity that was two orders of magnitude higher than the glass composition of Comparative Example 3, which also included potassium but did not include phosphorous. These results indicate that the presence of phosphorous in the glass composition significantly increases the hydrogen diffusivity. Similarly, the glass composition of Comparative Example 3 exhibited a hydrogen diffusivity that was two orders of magnitude higher than the Comparative Examples 1 and 2, which included lithium and sodium, respectively. The difference in hydrogen diffusivity between the potassium containing glass composition and the lithium and sodium containing glass compositions indicates that alkali ions with larger ionic radii allow for faster hydrogen diffusion.

Glass-based substrates including the glass composition of Example 6 were produced with thicknesses of 0.5 mm and 1.0 mm. The glass-based substrates were exposed to a 100% relative humidity environment at a temperature of 200° C. for a period of 7 days to produce glass-based articles of the type described herein. The glass-based articles exhibited a compressive stress region extending from the surface to a depth of compression. The maximum compressive stress measured for the 0.5 mm glass-based article was 124 MPa, and the maximum compressive stress measured for the 1.0 mm glass-based article was 137 MPa. The maximum central tension measured for the 0.5 mm glass-based article was 32 MPa, and the maximum central tension measured for the 1.0 mm glass-based article was 15 MPa. The depth of compression for the 0.5 mm glass-based article was 101 μm, and the depth of compression for the 1.0 mm glass-based article was 99 μm.

Figure 9:
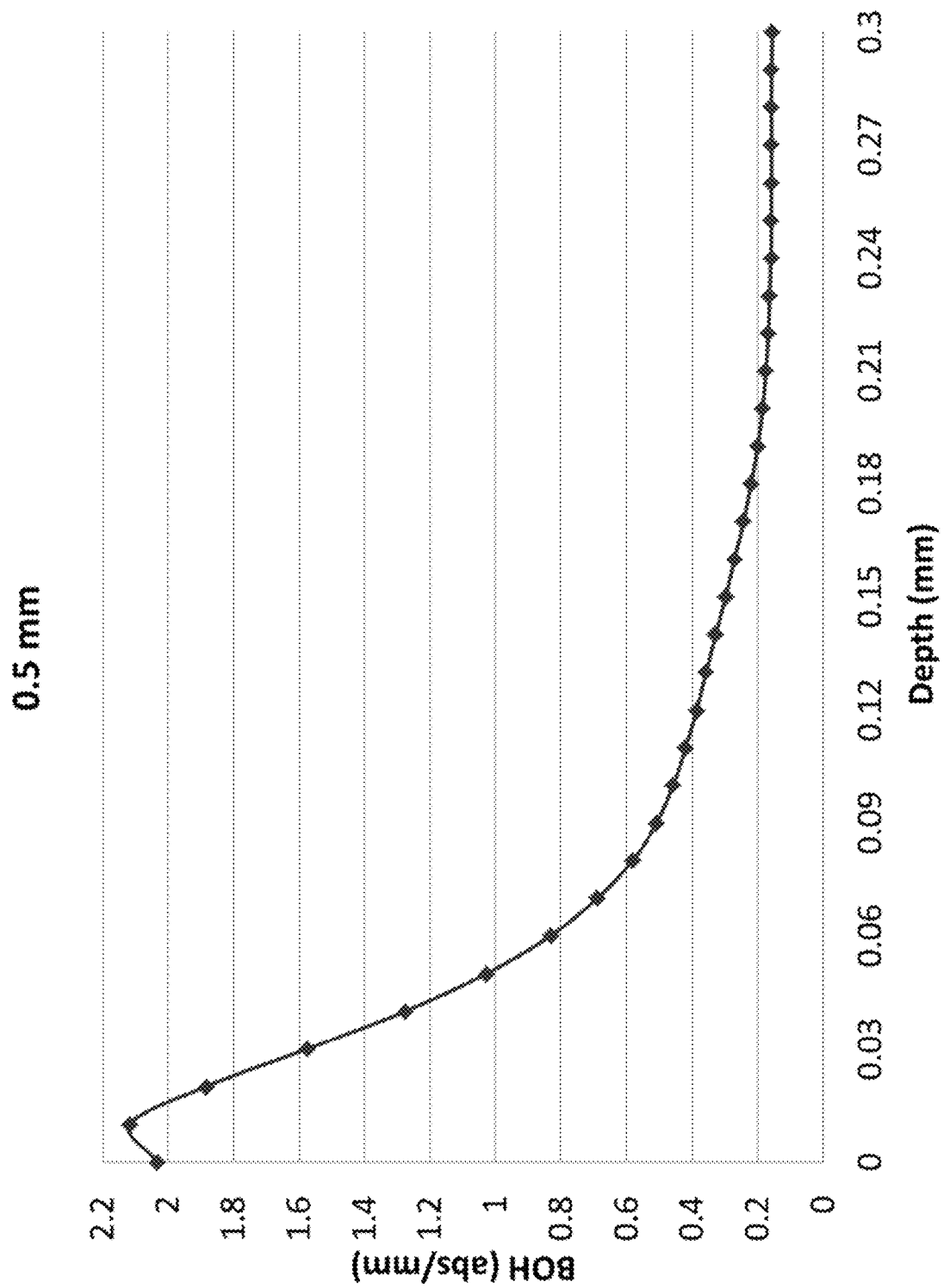
FIG. 9 is a plot of the hydroxyl (BOH) concentration of a 0.5 mm thick glass article as a function of depth from the surface after exposure to a water containing environment according to an embodiment.
Figure 10:
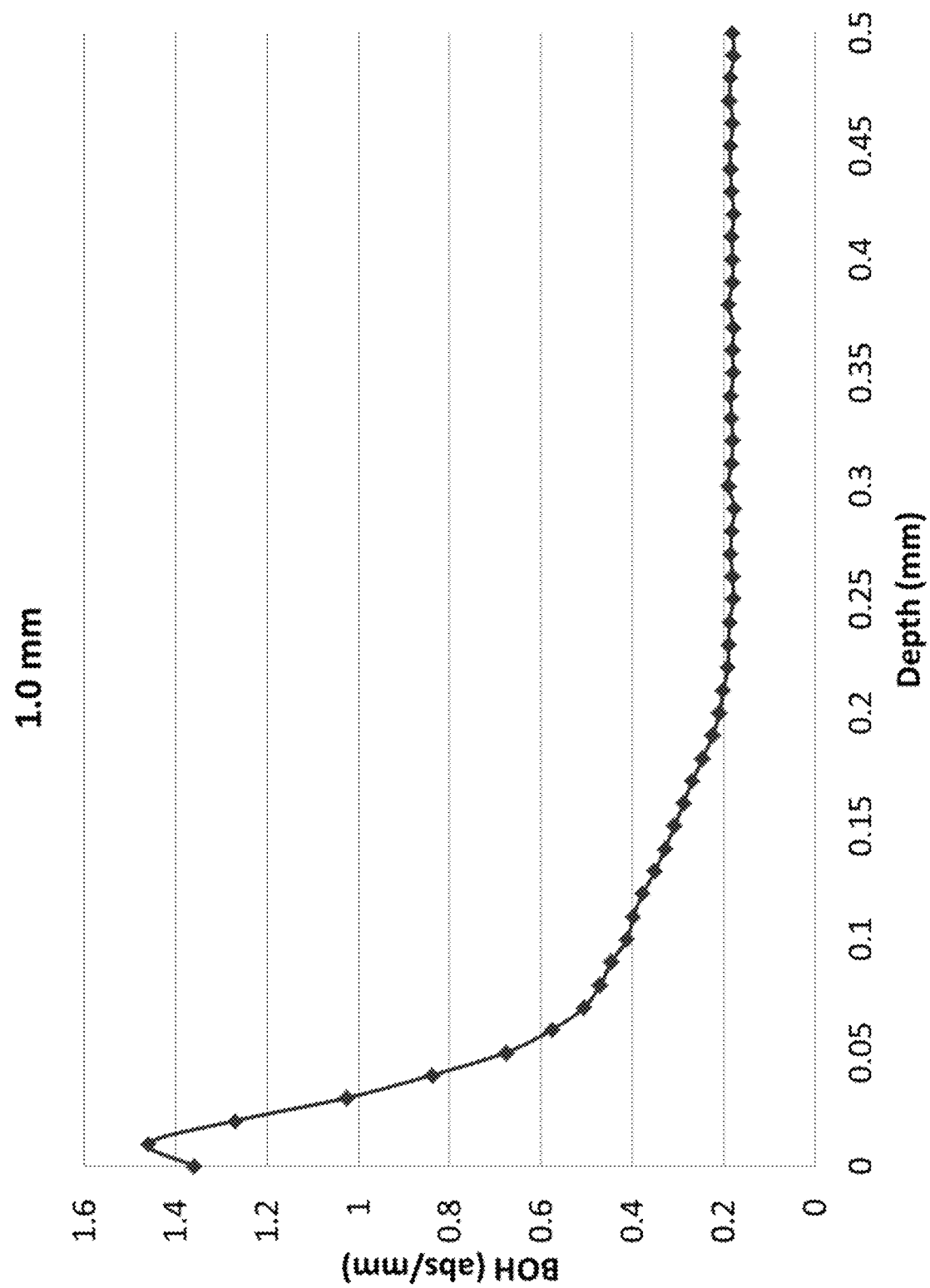
FIG. 10 is a plot of the hydroxyl (BOH) concentration of a 1.0 mm thick glass article as a function of depth from the surface after exposure to a water containing environment according to an embodiment.

Samples were also cut from the center of the 0.5 mm and 1.0 mm thick glass-based articles formed from the glass-based substrates including the glass composition of Example 6 after exposure to a 100% relative humidity environment at 200° C. for 7 days. The samples were then polished to a width of 0.5 mm and subjected to Fourier-transform infrared spectroscopy (FTIR) analysis. The FTIR analysis was performed with the following conditions: CaF/InSb, 64 scans, 16 $cm^{-1}$ resolution, 10 μm aperture, and 10 μm steps. The scans originated at the surface of the samples and continued to the approximate mid-point of the thickness. The spectrums were made relative to "dry" silica, and the hydroxyl (βOH) concentration was calculated using 3900 $cm^{-1}$ max and 3550 $cm^{-1}$ min parameters. It was not possible to distinguish bound hydroxyl from molecular hydroxyl due to the multi-component nature of the glass-based article, so the plots report the concentration of the total hydroxyl content. The measured hydroxyl concentration profiles of the 0.5 mm thick and 1.0 mm thick samples are shown in FIGS. 9 and 10, respectively. As shown in FIGS. 9 and 10, the depth within the samples where the measured hydroxyl content becomes substantially constant and equivalent to the hydroxyl content at the center of the articles, indicating the background hydroxyl content of the precursor glass-based substrate, was approximately 200 μm as measured with FTIR. The appearance of a buried hydroxyl concentration peak in FIGS. 9 and 10 is an artifact of the measurement method.

Square samples of with the composition of Example 1 were prepared with a thickness of 1 mm and 50 mm sides. Five of these samples were then treated in a 100% relative humidity environment at 200° C. for 121 hours. The resulting compressive stress (CS) and depth of compression (DOC) of the treated samples was then measured with FSM, yielding a CS of 167 MPa and DOC of 73 μm. The 5 steam treated samples and 3 control samples that were not exposed to the steam treatment were then subjected to abraded ring-on-ring (AROR) testing. The strength and peak load for each tested sample is reported in Table IV. As shown in Table IV, the steam treated samples exhibited a greatly increased peak load and strength in comparison to the non-treated control samples.

TABLE IV

| | Peak Load (kgf) | Strength (MPa) |
|---|---|---|
| Control Sample No. | | |
| 1 | 12.468 | 45.676 |
| 2 | 12.057 | 49.664 |
| 3 | 14.289 | 51.861 |
| Mean | 12.938 | 49.067 |
| Treated Sample No. | | |
| 1 | 42.296 | 170.492 |
| 2 | 41.067 | 153.003 |
| 3 | 38.182 | 170.168 |
| 4 | 38.799 | 154.273 |
| 5 | 38.420 | 150.417 |
| Mean | 39.752 | 159.671 |

The AROR test is a surface strength measurement for testing flat glass specimens, and ASTM C1499-09 (2013), entitled "Standard Test Method for Monotonic Equibiaxial Flexural Strength of Advanced Ceramics at Ambient Temperature," serves as the basis for the AROR test methodology utilized herein. The contents of ASTM C1499-09 are incorporated herein by reference in their entirety. The glass specimen is abraded prior to ring-on-ring testing with 90 grit silicon carbide (SiC) particles that are delivered to the glass sample using the method and apparatus described in Annex A2, entitled "abrasion Procedures," of ASTM C158-02 (2012), entitled "Standard Test Methods for Strength of Glass by Flexure (Determination of Modulus of Rupture).

The contents of ASTM C158-02 and the contents of Annex 2 in particular are incorporated herein by reference in their entirety.

Prior to ring-on-ring testing a surface of the glass-based article samples was abraded as described in ASTM C158-02, Annex 2, to normalize and/or control the surface defect condition of the sample using the apparatus shown in Figure A2.1 of ASTM C158-02. The abrasive material is sandblasted onto the surface of the glass-based article at an air pressure of 5 psi. After air flow is established, 1 cm$^3$ of abrasive material is dumped into a funnel and the sample is sandblasted.

Figure 11:
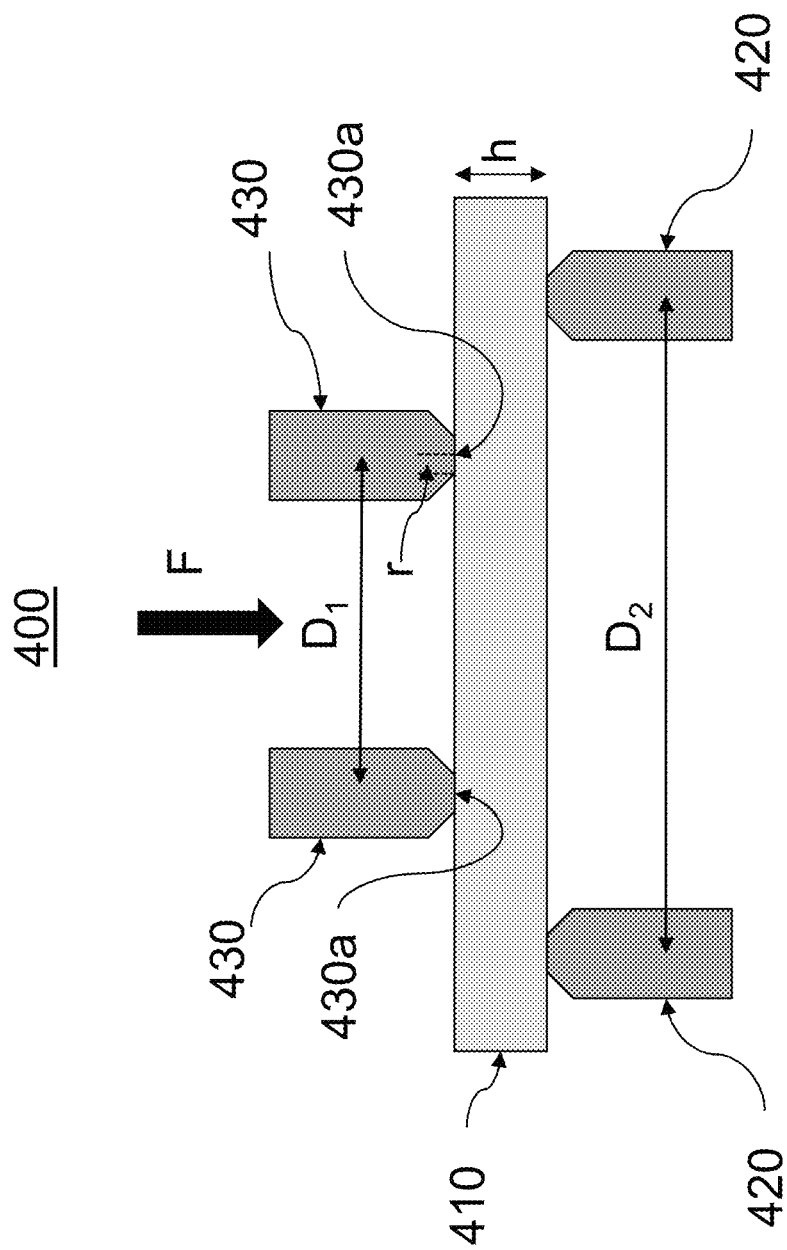
FIG. 11 is a side view of a ring-on-ring test apparatus.

For the AROR test, a glass-based article having at least one abraded surface as shown in FIG. 11 is placed between two concentric rings of differing size to determine equibiaxial flexural strength (i.e., the maximum stress that a material is capable of sustaining when subjected to flexure between two concentric rings). In the AROR configuration 400, the abraded glass-based article 410 is supported by a support ring 420 having a diameter D2. A force F is applied by a load cell (not shown) to the surface of the glass-based article by a loading ring 430 having a diameter D1.

The ratio of diameters of the loading ring and support ring D1/D2 may be in a range from 0.2 to 0.5. In some embodiments, D1/D2 is 0.5. Loading and support rings 430, 420 should be aligned concentrically to within 0.5% of support ring diameter D2. The load cell used for testing should be accurate to within ±1% at any load within a selected range. Testing is carried out at a temperature of 23±2° C. and a relative humidity of 40±10%.

For fixture design, the radius r of the protruding surface of the loading ring 430 is in a range of h/2≤r≤3h/2, where h is the thickness of glass-based article 410. Loading and support rings 430, 420 are made of hardened steel with hardness HRc>40. AROR fixtures are commercially available.

The intended failure mechanism for the AROR test is to observe fracture of the glass-based article 410 originating from the surface 430a within the loading ring 430. Failures that occur outside of this region—i.e., between the loading ring 430 and support ring 420—are omitted from data analysis. Due to the thinness and high strength of the glass-based article 410, however, large deflections that exceed ½ of the specimen thickness h are sometimes observed. It is therefore not uncommon to observe a high percentage of failures originating from underneath the loading ring 430. Stress cannot be accurately calculated without knowledge of stress development both inside and under the ring (collected via strain gauge analysis) and the origin of failure in each specimen. AROR testing therefore focuses on peak load at failure as the measured response.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

What is claimed is:

1. A method of manufacturing a glass-based article, comprising:
    substituting in monovalent hydrogen species for ions with an ionic radius of 0.133 nm or larger to form a hydrogen-containing layer of the glass-based article, wherein the hydrogen-containing layer extends from a surface of the glass-based article to the depth of layer, and hydrogen concentration of the hydrogen-containing layer decreases from a maximum hydrogen concentration to a depth of layer;
    wherein the depth of layer is greater than 5 μm; and
    wherein the glass-based article comprises:
        $SiO_2$;
        $Al_2O_3$;
        greater than or equal to 4 mol % to less than or equal to 15 mol % $P_2O_5$; and
        greater than or equal to 6 mol % to less than or equal to 25 mol % $K_2O$.

2. The method of claim 1, wherein the glass-based article has a Vicker's crack initiation threshold of at least 1 kgf.

3. The method of claim 1, wherein the depth of layer is at least about 10 μm.

4. The method of claim 1, wherein the maximum hydrogen concentration is located at the surface of the glass-based article.

5. The method of claim 1, further comprising at least one of $Li_2O$, $Na_2O$, $Cs_2O$, and $Rb_2O$.

6. The method of claim 1, wherein the center of the glass-based article comprises:
    greater than or equal to 45 mol % to less than or equal to 75 mol % $SiO_2$;
    greater than or equal to 3 mol % to less than or equal to 20 mol % $Al_2O_3$; and
    greater than or equal to 6 mol % to less than or equal to 15 mol % $P_2O_5$.

7. The method of claim 1, wherein the center of the glass-based article comprises:
    greater than or equal to 45 mol % to less than or equal to 75 mol % $SiO_2$; and
    greater than or equal to 3 mol % to less than or equal to 20 mol % $Al_2O_3$.

8. The method of claim 1, wherein the center of the glass-based article comprises:
    greater than or equal to 55 mol % to less than or equal to 69 mol % $SiO_2$;
    greater than or equal to 5 mol % to less than or equal to 15 mol % $Al_2O_3$;
    greater than or equal to 6 mol % to less than or equal to 10 mol % $P_2O_5$; and
    greater than or equal to 10 mol % to less than or equal to 20 mol % $K_2O$.

9. The method of claim 8, wherein the center of the glass-based article comprises:
    greater than 0 mol % to less than or equal to 10 mol % $Cs_2O$; and
    greater than 0 mol % to less than or equal to 10 mol % $Rb_2O$.

10. The method of claim 1, wherein the glass-based article is substantially free of at least one of lithium and sodium.

11. The method of claim 1, further comprising a compressive stress layer extending from a surface of the glass-based article into the glass-based article to a depth of compression.

12. The method of claim 11, wherein the compressive stress layer comprises a compressive stress of greater than or equal to 100 MPa and the depth of compression is greater than or equal to 75 μm.

13. A method of manufacturing a glass-based article, comprising:
    substituting in monovalent hydrogen species for ions with an ionic radius of 0.133 nm or larger to form a hydrogen-containing layer of the glass-based article, wherein the hydrogen-containing layer extends from a surface of the glass-based article to the depth of layer, and hydrogen concentration of the hydrogen-containing layer decreases from a maximum hydrogen concentration to a depth of layer;

wherein the depth of layer is greater than 5 μm;

wherein a portion of the glass-based article is in compressive stress of greater than or equal to 100 MPa; and wherein the glass-based article comprises:
- greater than or equal to 45 mol % to less than or equal to 75 mol % $SiO_2$;
- greater than or equal to 3 mol % to less than or equal to 20 mol % $Al_2O_3$;
- greater than or equal to 4 mol % to less than or equal to 15 mol % $P_2O_5$; and
- greater than or equal to 6 mol % to less than or equal to 25 mol % $K_2O$.

14. The method of claim 13, wherein the depth of layer is at least about 10 μm.

15. The method of claim 13, wherein the maximum hydrogen concentration is located at the surface of the glass-based article.

16. The method of claim 13, the one or more alkali metal oxides further comprising $Cs_2O$ and/or $Rb_2O$.

* * * * *

UNITED STATES PATENT AND TRADEMARK OFFICE
CERTIFICATE OF CORRECTION

PATENT NO. : 11,643,356 B2
APPLICATION NO. : 17/838404
DATED : May 9, 2023
INVENTOR(S) : Timothy Michael Gross et al.

It is certified that error appears in the above-identified patent and that said Letters Patent is hereby corrected as shown below:

On the Title Page

On the page 3, in Column 1, under "Other Publications", Line 13, delete "Writien" and insert -- Written --.

On the page 3, in Column 2, under "Other Publications", Line 9, delete "Si02—Ca0—Al2O3—K2O—" and insert -- $SiO_2$—CaO—$Al_2O_3$—$K_2O$— --.

On the page 3, in Column 2, under "Other Publications", Line 10, delete "Phsyics" and insert -- Physics --.

On the page 3, in Column 2, under "Other Publications", Line 15, delete "Infared" and insert -- Infrared --.

On the page 3, in Column 2, under "Other Publications", Line 21, delete "Na2O—Si02" and insert -- $Na_2O$—$SiO_2$ --.

In the Specification

In Column 1, Line 13, delete "entirety" and insert -- entirety. --.

Signed and Sealed this
Third Day of December, 2024

Katherine Kelly Vidal
*Director of the United States Patent and Trademark Office*